United States Patent [19]

Achkar et al.

[11] Patent Number: 5,508,932
[45] Date of Patent: Apr. 16, 1996

[54] METHOD AND DEVICE FOR EARTH ACQUISITION USING THE POLE STAR FOR A THREE-AXIS STABILIZED SATELLITE IN A LOW INCLINATION ORBIT

[75] Inventors: Issam-Maurice Achkar, Cannes-La-Bocca; Pierre Guillermin, Nice; Hervé Renault, Cannes, all of France

[73] Assignee: Aerospatiale Societe Nationale Industrielle, France

[21] Appl. No.: 61,615

[22] Filed: May 13, 1993

[30] Foreign Application Priority Data

May 19, 1992 [FR] France ..................... 92 06050

[51] Int. Cl.$^6$ .......................... G06F 165/00; B64G 1/34
[52] U.S. Cl. .......................... 364/459; 364/455; 244/164; 244/171
[58] Field of Search .................... 364/455, 459; 244/164, 165, 166, 170, 171

[56] References Cited

U.S. PATENT DOCUMENTS

| | | | |
|---|---|---|---|
| 4,617,634 | 10/1986 | Izumida et al. | 364/455 |
| 4,621,329 | 11/1986 | Jacob | 364/455 |
| 4,746,976 | 5/1988 | Kamel et al. | 364/455 |
| 5,107,434 | 4/1992 | Paluszek | 364/459 |
| 5,109,346 | 4/1992 | Wertz | 364/459 |
| 5,177,686 | 1/1993 | Böinghoff et al. | 364/459 |

FOREIGN PATENT DOCUMENTS

| | | |
|---|---|---|
| 0209429 | 1/1987 | European Pat. Off. . |
| 0267086 | 5/1988 | European Pat. Off. . |
| 0338687 | 10/1989 | European Pat. Off. . |
| 0363244 | 4/1990 | European Pat. Off. . |
| 0461394 | 12/1991 | European Pat. Off. . |
| 0493228 | 7/1992 | European Pat. Off. . |
| 0493143 | 7/1992 | European Pat. Off. . |
| 0493227 | 7/1992 | European Pat. Off. . |
| 2522614 | 9/1983 | France . |

*Primary Examiner*—Gary Chin
*Attorney, Agent, or Firm*—Remy J. VanOphem; John VanOphem

[57] ABSTRACT

Earth acquisition from the Sun pointing attitude starts with angular displacement of the satellite so that, in the field of view of a Sun sensing system, the direction of the Sun is brought into an orientation S' such that subsequent rotation of the satellite about the orientation S' brings the Pole Star into the field of view of a star sensing system whose optical axis is substantially parallel to the pitch axis. During this rotation the stars sensed are compared with those in a catalog containing, in addition to the Pole Star, stars likely to be encountered upon such movement. At least two of these stars are identified and then the Pole Star is captured. The satellite is then rotated in pitch until the Earth is sensed and captured.

16 Claims, 14 Drawing Sheets

METHOD AND DEVICE FOR EARTH ACQUISITION USING THE POLE STAR FOR A THREE-AXIS STABILIZED SATELLITE IN A LOW INCLINATION ORBIT

BACKGROUND OF THE INVENTION

1. Field of the Invention

The present invention concerns an Earth acquisition method and device for a three-axis stabilized satellite in Earth orbit at a low inclination (less than 10°) to the Equator in order to return the satellite from a Sun pointing safeguard or standby attitude to its nominal Earth pointing attitude.

2. Description of the Prior Art

The three axes with respect to which a satellite is to be stabilized in a nominal attitude are an axis directed towards the Earth called the yaw axis usually denoted Z, an axis perpendicular to the plane of the orbit called the pitch axis denoted Y and an X axis completing the orthogonal axis system and called the roll axis.

Any three-axis stabilized telecommunication or observation satellite (these are typical missions in low inclination orbits) has at least one 2-axis Earth sensor and two 1-axis Sun sensors with orthogonal axes (or a single 2-axis Sun sensor) with fields of view substantially separate from that of the Earth sensor for detecting attitude errors and rate gyros for measuring angular speeds about the three axes.

Torque for changing attitude and/or angular speed is usually produced by actuators such as wheels (momentum or reaction wheels) and/or thrusters.

This set of sensors and actuators associated with one or more electronic measurement processors and torque calculators constitutes what is usually referred to as the orbit and attitude control system (OACS) of the satellite.

In the event of a serious fault in the OACS in the nominal orbit or in response to an erroneous telecontrol signal transmitted from the control station on the ground, the satellite may depart from its nominal attitude and take up a Sun pointing safeguard attitude with the X axis pointing towards the Sun (the 1-axis solar sensors are usually placed on this X axis) with the Y and Z axes rotating about the X axis at a constant speed, typically 0.5°/s. In the meantime, if necessary, an angular momentum generator system (wheels) will have been operated to reduce to zero any angular momentum of the satellite that is non-null on average in order to facilitate rotating the satellite about the Sun pointing direction. In this mode, the Sun is always within view of the Sun sensors but the Earth is usually not in view of the Earth sensor.

The Sun pointing attitude may be a standby nominal attitude, applying for example while the satellite is on a transfer orbit en route to its final station.

When the fault has been processed and corrected, either on board the satellite or from the ground, or at the time when the standby attitude is to be terminated, it is therefore necessary for the satellite to (re)acquire the Earth in order to begin (or resume) normal operation of the mission. It is standard practice (especially on EUTELSAT-II) to seek the Earth by rotation about an axis aligned with the direction of the Sun relative to a reference marker which is continuously measured on board the satellite by means of the Sun sensors until the Earth enters the field of view of the Earth sensor. The rotation is then stopped and Earth capture initiated. There are periods during the day when such rotation cannot be used, in particular between 20:00 and 04:00 satellite solar time, during which period the Sun is usually not in view of the 2-axis Sun sensors needed to control the rotation axis about which occurs the conical movement enabling the Z axis to cross the Earth. In this case a more general method using a star sensor, for example—in addition to the Sun and Earth sensors—is needed if the Earth is to be acquired even when the Earth/satellite/Sun geometry is not favorable to this.

Satellite attitude control concepts using a star sensor in addition to Sun and Earth sensors are already known and are the subject matter of, among others, French Patent No. 2,522,614 the Centre National d'Etudes Spatiales (inventors MOUILHARAT, DUCHON, GUILBERT and ROLFO) entitled "Configuration de satellite à orbite équatoriale à moyens solaires perfectionnés" ("Equitorial orbit satellite configuration with improved solar means"); French Patent No. 2,637,565 to AEROSPATIALE (inventor MAUTE) entitled "Système de contrôle actif selon trois axes d'un satellite géostationnaire" ("Active three-axis control system for a geostationary satellite"); and European Patent No. 0,338,687 to BRITISH AEROSPACE (inventor MATTHEWS) entitled "Method of and apparatus for returning an Earth orbiting spacecraft to an Earth pointing attitude after displacement therefrom".

In the first patent there is no disclosure as to acquisition of the Earth from the Sun pointing attitude and the satellite embodies a platform and a payload rotatable relative to the platform between which the sensors are disposed.

The second patent suggests for the change from the Sun pointing attitude to the nominal attitude the principle of scanning a series of stars by a star sensor as the satellite rotates about its roll axis in an attitude such that the roll axis remains parallel to the projection of the direction of the Sun in the plane of the Equator, followed by rotation in pitch about the direction defined by the Pole Star to reacquire the Earth by means of the Earth sensor. This document is extremely vague as to how this principle is to be put into practice, however, in particular with regard to detection of the direction representing the projection onto the Equatorial plane of the direction of the Sun and then as to identification of the Pole Star.

The third patent is slightly more precise as to how the Earth is reacquired. It proposes a satellite provided with a 2-axis Earth sensor, a 2-axis Sun sensor and a star sensor mounted on the satellite so as to be able to sense the star CANOPUS in the Southern hemisphere; this satellite must be provided with an angular momentum generator. The reacquisition process starts conventionally by rotating the satellite with the Sun sensor pointing at the Sun (this is the conventional Sun pointing attitude). When CANOPUS enters the field of view of the star sensors, rotation is stopped and an angular momentum is generated by activating the generator so as to confer gyroscopic stiffness about a fixed direction of the satellite. Rotation about the Sun direction continues by an angle calculated using the date and astronomical tables so that subsequent rotation about the instantaneous direction of the angular momentum axis will bring the Earth into the field of view of the Earth sensor.

This disclosure presupposes the use of a star sensor with a very wide field of view as CANOPUS is more than 35° away from geographical South; it is in any event doubtful that in any configuration simple rotation in Sun pointing mode would necessarily bring CANOPUS into the field of view of the star sensor, unless it is assumed that this rotation could take place over a long period (several hours) which would be incompatible with most missions. Also, nothing is stated as to how CANOPUS is identified. Finally, the necessity to rotate the satellite about the Sun direction after generation of the angular momentum (a priori transverse to the rotation axis) introduces parasitic phenomena which are difficult to control because of the gyroscopic stiffness.

An object of the invention is to alleviate the inadequacies and drawbacks mentioned above by proposing a method and device enabling Earth acquisition from a Sun pointing attitude mode in any Earth/satellite/Sun configuration within a timespan compatible with modern mission requirements (typically less than 30 minutes) by fast and reliable intermediate sensing of the Pole Star (which is less than 1° away from geographical North).

Of course, to do this the satellite must have a star sensor having a sufficiently wide field of view (greater than or equal to 2×(orbital inclination+1°)) and capable of sensing the Pole Star (visual magnitude= 2.3). Also, this sensor must be disposed on the satellite so that its optical axis is preferably parallel to or near the (−Y) axis of the satellite.

SUMMARY OF THE INVENTION

In one aspect the invention is an earth acquisition method for a satellite in Earth orbit at an inclination of less than 10° to the equator adapted to be stabilized in attitude about roll, pitch and yaw axes and embodying a 2-axis Earth sensing system having an optical axis adapted to be pointed towards the Earth substantially parallel to the yaw axis, a 2-axis star sensing system having an optical axis adapted to be pointed towards the Pole Star substantially parallel to the pitch axis, and a Sun sensing system embodying a 2-axis Sun sensing sub-system having an optical axis substantially orthogonal to the optical axis of the star sensing system and transverse to the optical axis of the Earth sensing system. According to the method of the invention, starting from a Sun pointing attitude in which the optical axis of the Sun sensing sub-system is pointed towards the Sun, angular displacement of the satellite is commanded to move the Sun direction into an orientation which in the field of view of the Sun sensing sub-system is at an angle $\lambda$ other than 90° to the optical axis of the Sun sensing system, the angle $\lambda$ satisfies the condition:

$$90°-\delta s-Fspx<\lambda<90°-\delta s+Fspx$$

where $\delta s$ is the declination of the Sun relative to the equator and Fspx is the angular half-amplitude of the field of view of the star sensing system in a plane of the satellite containing the optical axis of the star sensing system and the orientation.

The satellite is rotated about the orientation so that the optical axis of the star sensing system describes part of a cone with its axis directed towards the Sun and a half-angle equal to $\lambda$.

A group of at least two stars is sensed and compared with stars in a predetermined catalog as a function of $\lambda$ listing stars, including the Pole Star, likely to be sensed during the rotation about the orientation, the stars of the group are identified and the time at which the optical axis of the star sensing system will point substantially towards the Pole Star is predicted.

The rotation is braked before the predicted time and the Pole Star is then captured on the optical axis of the star sensing system.

The satellite is then rotated about the optical axis of the star sensing system until the Earth is sensed by the Earth sensing system and the Earth is captured on the optical axis of the Earth sensing system.

It will be understood that the method of acquiring the Earth using the Pole Star is of evident originality for the Earth seek and capture phases as compared with that based on the star CANOPUS and the subject matter of European Patent No. 0,338,687 as it is not necessary to employ any angular momentum generator device (one or more momentum wheels) to execute the Earth seek phase or to correct the orientation of the angular momentum during the Earth capture phase. This significantly simplifies the control laws: conventional 3-axis control only, with no on-board angular momentum.

According to preferred features of the invention, some of which may be combinable, the optical axis of the Sun sensing sub-system is parallel to the roll axis. The orientation of the direction of the Sun in the field of view of the Sun sensing sub-system is substantially coplanar with the optical axes of the Sun sensing sub-system and the star sensing system. On rotation about the orientation the coordinates of each star of the group are measured in the field of view of the star sensing system and the distance between two stars of the group is compared with the distance predicted by the catalog for each pair of stars included therein and the two stars of the group are identified with the pair of stars from the catalog at the same distance apart, to the nearest predetermined difference. A magnitude of each star is further measured representative of its brightness and the two stars between which the distance is measured are the brightest two stars of the group. The catalog contains between 10 and 300 stars characterized by their magnitude, their right ascension and their declination relative to an inertial frame of reference. The group of stars is sensed during rotation about the orientation having an angular amplitude at most equal to 180°.

In another aspect the invention is a device for Earth acquisition from a Sun pointing attitude by a satellite in Earth orbit inclined at less than 10° to the equator adapted to be attitude stabilized about roll, pitch and yaw axes which embodies a 2-axis Earth sensing system having an optical axis adapted to be pointed towards the Earth substantially parallel to the yaw axis, a 2-axis star sensing system having an optical axis adapted to be pointed towards the Pole Star substantially parallel to the pitch axis, a Sun sensing system embodying a 2-axis Sun sensing sub-system having an optical axis substantially orthogonal to the optical axis of the star sensing system and transverse to the optical axis of the Earth sensing system, an angular speed sensing system adapted to measure speeds about three axes, an actuator system adapted to generate command torque on the satellite and a processing system connected between the sensing systems, the angular speed sensing system and the actuator system and adapted to generate command instructions for the actuator system from measurement signals supplied by the sensing systems and the angular sped sensing system. The device is included in the processing system and has:

measurement processing logic adapted to determine from the measurement signal coordinates in the roll, pitch and yaw axis frame of reference the direction of the Sun and the instantaneous speed of the satellite and roll, pitch and yaw angles;

Pole Star identification logic adapted on the basis of measurement signals from the star sensing system and coordinates and angles supplied by the measurement processing logic to identify stars sensed by the star sensing system with stars contained in a catalog, to predict when the Pole Star comes into the star sensing system, and to generate identification data;

an acquisition sub-mode chaining unit for generating acquisition sub-mode selection signals from the coordinates and angles supplied by the measurement processing logic and the identification data supplied by the Pole Star identification logic; and attitude control logic adapted to generate from the acquisition sub-mode selection signals and the coordinates and angles supplied by the measurement processing logic command signals applied to the actuator system whereby:

in a first sub-mode, the optical axis of the star sensing system is scanned in a cone around the direction of the Sun having a half-angle at least approximately equal to the angular offset between the respective Sun and Pole Star directions, in a second sub-mode, rotation of the satellite is braked, in a third sub-mode, the Pole Star is captured in the star sensing system, in a fourth sub-mode, the satellite is rotated in pitch and the Pole Star is maintained captured, in a fifth sub-mode, the Earth is captured in the Earth sensing system.

According to other preferred features of the invention, some of which may be combinable, the identification data generated by the Pole Star identification logic includes a binary signal which changes level when the Pole Star is identified and an angular signal representing the angular offset between the Pole Star direction and the optical axis of the star sensing system. The attitude control logic includes a set of regulators and limiters specific to each sub-mode, and the regulators are linear. The attitude control logic includes filters at the output of the set of regulators and limiters, the filters being second order digital filters. The attitude control logic includes modulators at the filter outputs, the modulators being Pseudo-Rate Modulators. The actuator system includes thrusters and the attitude control logic includes thruster selection logic which is hardwired or stored in onboard memory which is part of an onboard computer.

Objects, features and advantages of the invention will emerge from the following description given by way of non-limiting example with reference to the appended drawings.

DETAILED DESCRIPTION OF THE PREFERRED EMBODIMENT

Figure 1:
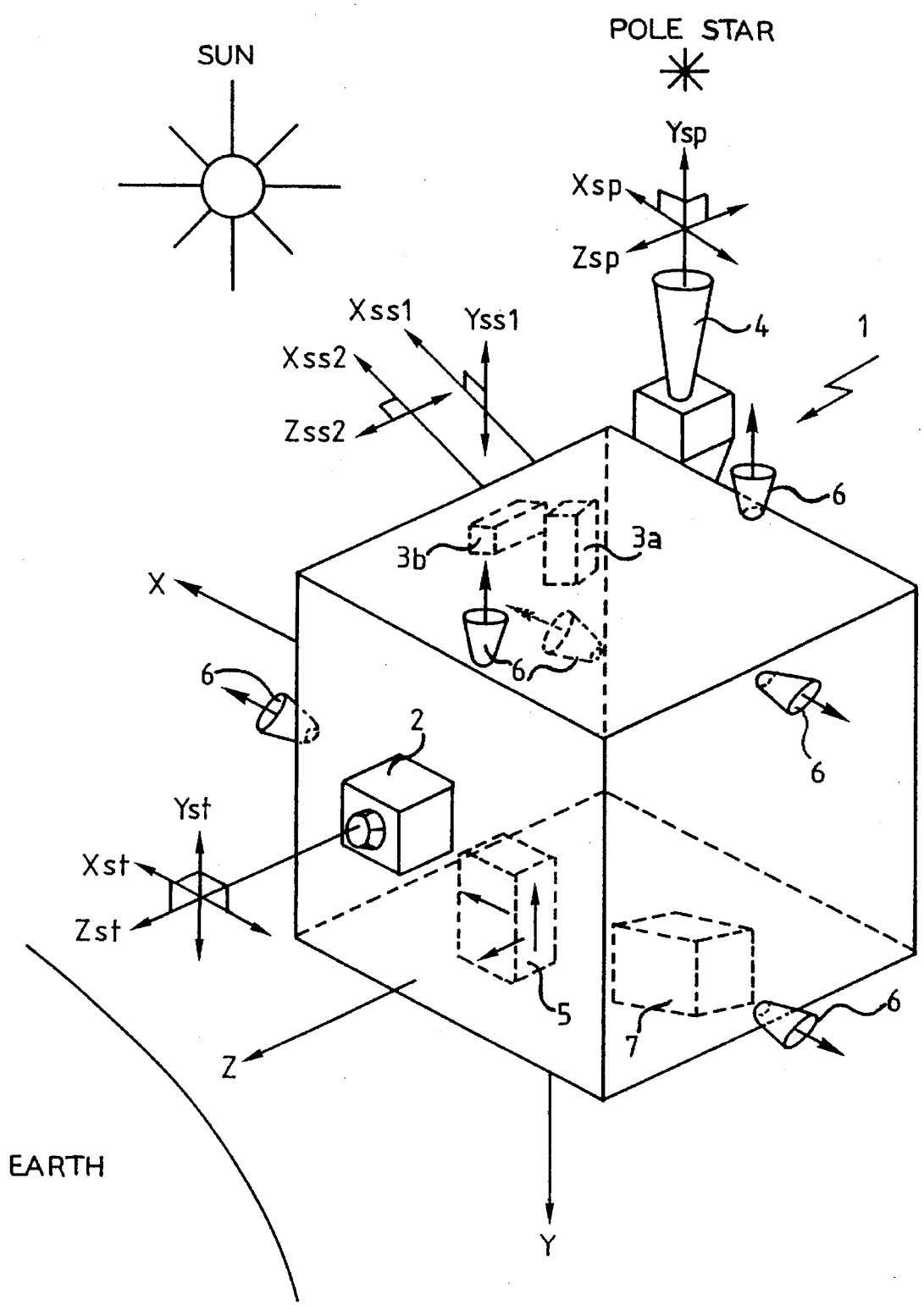
FIG. 1 is a diagrammatic perspective view of a satellite in accordance with the invention.

FIG. 1 is a diagrammatic representation of the body 1 of a 3-axis stabilized satellite in accordance with the invention conventionally embodying a solar generator with one or more panels (not shown).

The three axes (in practice the main inertia axes) about which the satellite (i.e. its body) is to be stabilized in a nominal attitude on a given terrestrial orbit of low inclination are an axis directed towards the Earth called the yaw axis and usually denoted Z, an axis perpendicular to the plane of the orbit and directed towards the South, called the pitch axis and denoted Y, and an X axis forming an orthogonal axis system (X, Y, Z) with the pitch and yaw axes and called the roll axis. In practice, when the orbit is circular, the roll axis is tangential to the orbit and preferably in the same direction as that in which the satellite executes the orbit. The solar generator is usually elongate parallel to the pitch axis.

The satellite body 1 embodies an orbit and attitude control system including at least:

an Earth sensing system 2, in this example a single 2-axis sensor, having an optical axis Zst parallel to or near the Z axis and two measurement axes Xst and Yst (these are orthogonal in practice) transverse to the optical axis, advantageously near or even parallel to the satellite X and Y axes, respectively;

a Sun sensing system constituted by at least one Sun sensing subsystem 3 having an optical axis Xss substantially transverse to the Z and Y axes, preferably parallel to or near the X (or –X) axis and having two measurement axes Yss and Zss (these are also orthogonal in practice) advantageously close or even parallel to the Y and Z axes, respectively; in practice the Sun sensing system further includes other 1-axis Sun sensing subsystems (not shown) arranged on the body 1 (–X) to ensure that the Sun can be sensed at any time the satellite is in the Sun pointing attitude; in this example the Sun sensing subsystem 3 has two 1-axis sensors 3a and 3b whose respective single measurement axes are the aforementioned axes Yss and Zss (in FIG. 1 subscripts 1 and 2 are further used to distinguish between these two sensors);

a star sensing system 4, in this example in the form of a single 2-axis sensor having an optical axis Ysp pointing towards the North in order to be able to sense the Pole Star (which is very close to geographical North) and two measurement axes (these are also in practice orthogonal) Xsp and Zsp preferably parallel to or near the X and Z axes, respectively; the star sensing system 4 is in practice offset from the Y axis by a distance sufficient to prevent the solar generator encroaching significantly upon its field of view;

an angular speed sensing system 5, a system of rate gyros, for example, for measuring the angular speed of the satellite about three axes preferably parallel to the X, Y and Z axes;

an actuator system, in this example in the form of at least six thrusters 6 to generate positive and negative torque about the X, Y and Z axes; and an analog or digital electronic processor system 7 for processing measurements supplied by the sensing systems using conventional control laws to work out a nominal attitude control regime or control laws to be described in detail later in reacquisition mode to generate commands to the actuator system (via filters, limiters and modulators).

To facilitate a good understanding of what follows, it would seem beneficial to review various concepts and magnitudes that will be referred to.

Figure 2:
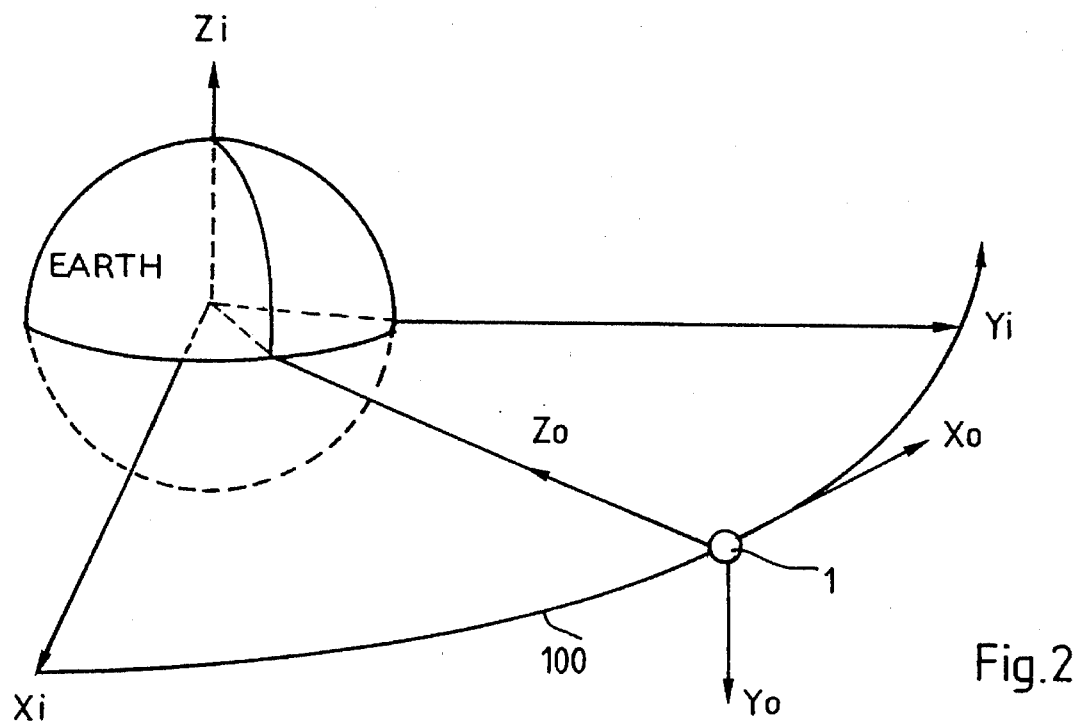
FIG. 2 is a diagram defining the concepts of an inertial frame of reference and a local orbital frame of reference.

FIG. 2 shows the satellite body 1 in its orbit 100 about the Earth (here the orbit is assumed to lie in the Equatorial plane).

The frame of reference embodying an axis Xi oriented in practice towards a so-called "vernal point" corresponding by convention to the direction of the Sun in 1950 at 00:00 on the day of the Spring Equinox, an axis Zi pointing towards geographical North and an axis Yi completing an orthogonal axis system (Xi, Yi, Zi) is called an inertial frame of reference.

The frame of reference at a given point on the orbit where the satellite is located at the time in question embodying an axis Zo pointing towards the Earth, an axis Yo perpendicular to the plane of the orbit and pointing towards the South and an axis Xo completing an orthogonal axis system (Xo, Yo, Zo) is called the local orbital frame of reference.

Figure 3:
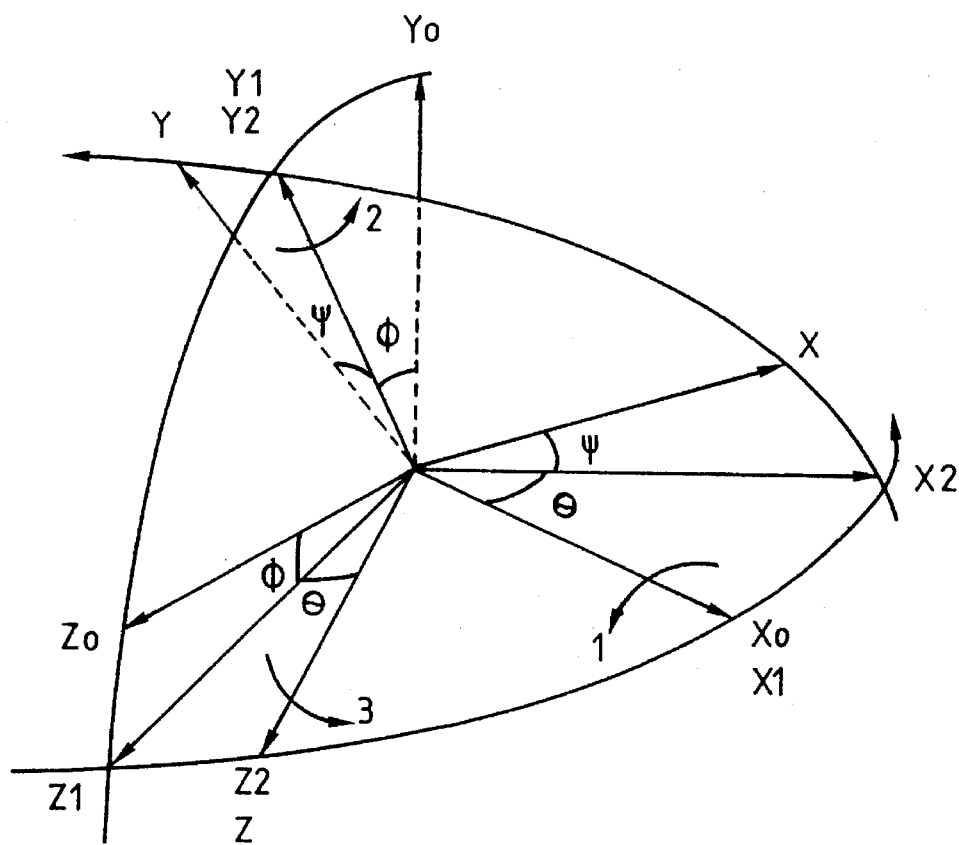
FIG. 3 is a diagram defining the roll, pitch and yaw angles.

The (Xo, Yo, Zo) axis system is repeated in FIG. 3 which further shows axis systems (X1, Y1, Z1), (X2, Y2, Z2) and X, Y, Z) derived from the (Xo, Yo, Zo) axis system by rotation in roll by angle $\Phi$, then rotation in pitch by an angle $\theta$ and finally rotation in yaw by an angle $\phi$. These angles define the attitude of the satellite frame of reference relative to the local orbital frame of reference. The objective for the orbit and attitude control system is to superimpose the satellite XYZ frame reference with the (Xo, Yo, Zo) frame of reference.

Figure 4:
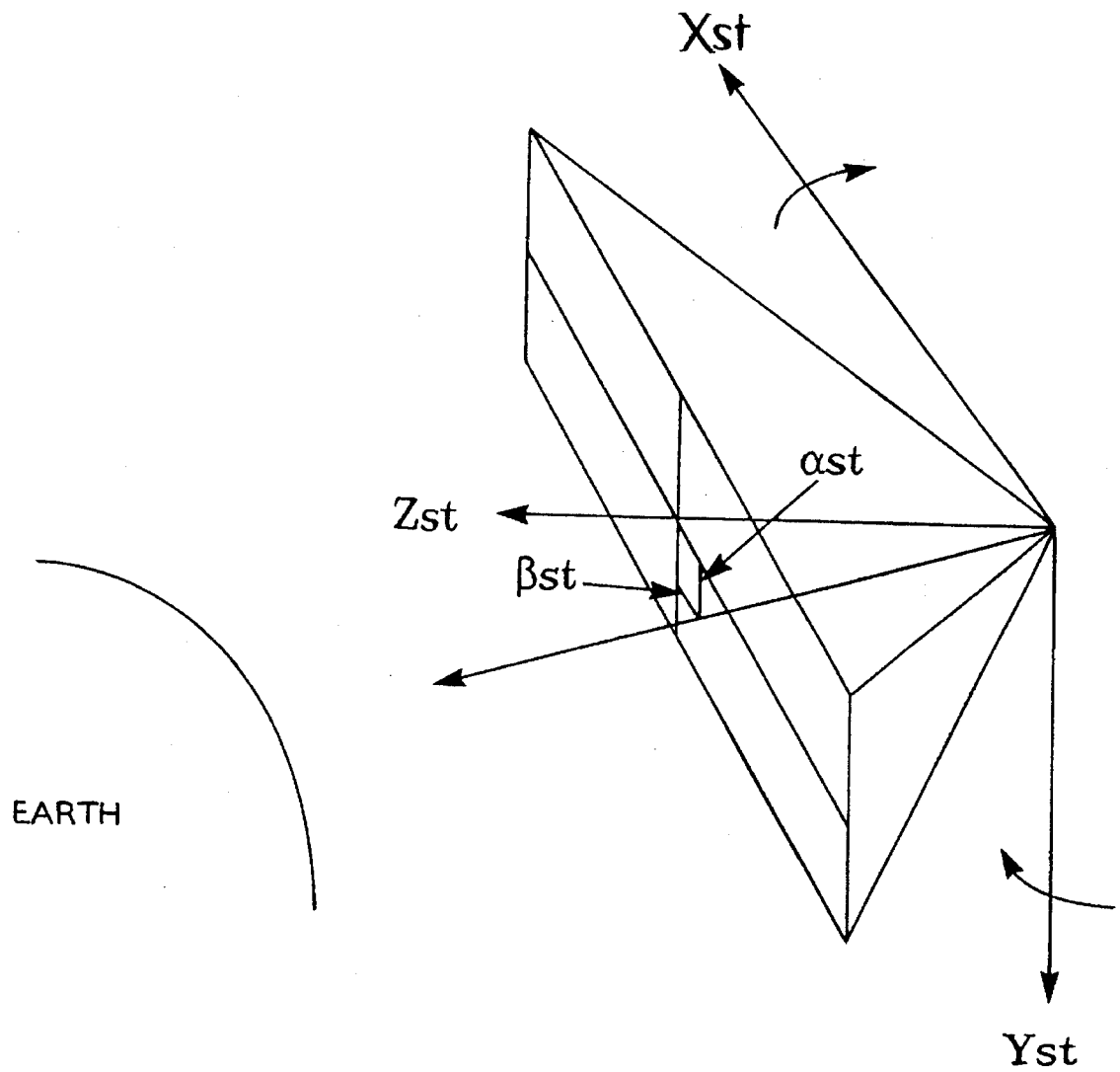
FIG. 4 is a diagram defining the Earth sensor measurement angles.

Referring again to the sensing systems mentioned above with reference to FIG. 1, the sensor constituting the Earth sensing system 2 has a field of view with an angular aperture typically between $\pm 2°$ in roll and $\pm 9°$ in pitch (this is the linear zone of the IRES/GALILEO sensor on EUTELSAT II) (see FIG. 4).

The angles $\alpha$st and $\beta$st define the angular position of the Earth boresight relative to the Zst axis, these angles being measured relative to the Yst and Xst axes. Knowing the matrix Pst for changing from the (Xst, Yst, Zst) frame of reference to the satellite (X, Y, Z) frame of reference, it is known how to calculate from the aforementioned angles, using simple trigonometrical formulae, the roll and pitch angles $\Phi$st and $\theta$st.

Similarly, the sensor constituting the star sensing system 4 has a field of view with an angular aperture at least equal to 2×(orbital inclination+1°) and sufficient sensitivity to detect the Pole Star (the visual magnitude of which is approximately 2.3). For each star in its field of view this sensor delivers a measured magnitude Msp (visual magnitude, for example) and coordinates Xsp and Zsp of the center of mass of the star in the (Xsp, Zsp) frame of reference; this type of sensor does not supply angles directly; however, it is a simple matter to calculate the attitude angles $\alpha$sp and $\beta$sp because, knowing the matrix Psp for changing from the (Xsp, Ysp, Zsp) frame of reference to the (X, Y, Z) frame of reference and the components Pxo, Pyo and Pzo of the unit vector of the polar direction in the local orbital frame of reference (Xo, Yo, Zo)—components determined according to the orbital position of the satellite and the components of the polar direction unit vector, in the (Xi, Yi, Zi) inertial frame of reference—it is known how to calculate, using simple trigonometrical formulae, the roll and yaw angles $\Phi$sp and $\phi$sp (of course, unless there is a fault, the roll angles $\Phi$st and $\phi$sp must be the same to within the measurement accuracy.

The Sun sensing subsystem 3 embodies (see above) two 1-axis sensors 3a and 3b; their fields of view are parallel to a respective single direction (these single directions are orthogonal) with in practice a wide aperture (typically $\pm 60°$ each); each sensor 3a and 3b supplies a single magnitude NS1 or NS2; it is a simple matter to deduce from them measured values for the angles between the direction of the Sun and the respective sensor measurement axis. Knowing the matrices Pss1 and Pss2 for changing from the frames of reference of the sensors to the satellite frame of reference and applying simple trigonometrical transformations it is possible to determine the components Sbx, Sby and Sbz of the unit vector directed towards the Sun in the (X, Y, Z) frame of reference.

The speed sensing system 5 supplies either speed measurements (if it comprises simple rate gyros) or rotation increment measurements (if it comprises integrating rate gyros) about the three sensing axes. In this latter case, the gyro speeds $\omega$gx, $\omega$gy and $\omega$gz are calculated from the rotation increments $\alpha$gx, $\alpha$gy and $\alpha$gz, by differentiation, for example, possibly preceded by change of frame of reference processing if the sensing axes of the system 5 are not coincident with the satellite axes.

Figure 5:
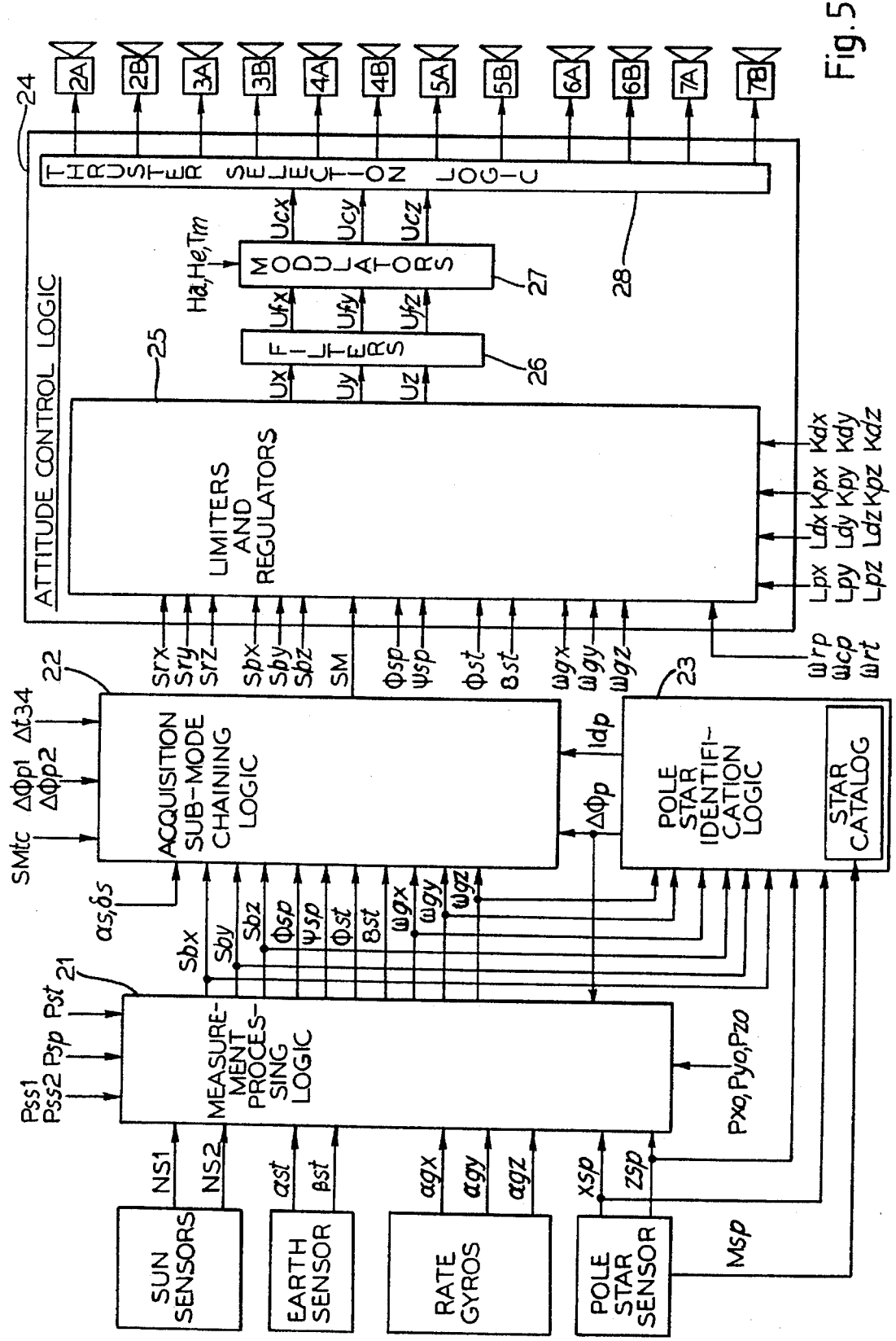
FIG. 5 is a block diagram of an Earth acquisition device in accordance with the invention.
Figure 6:
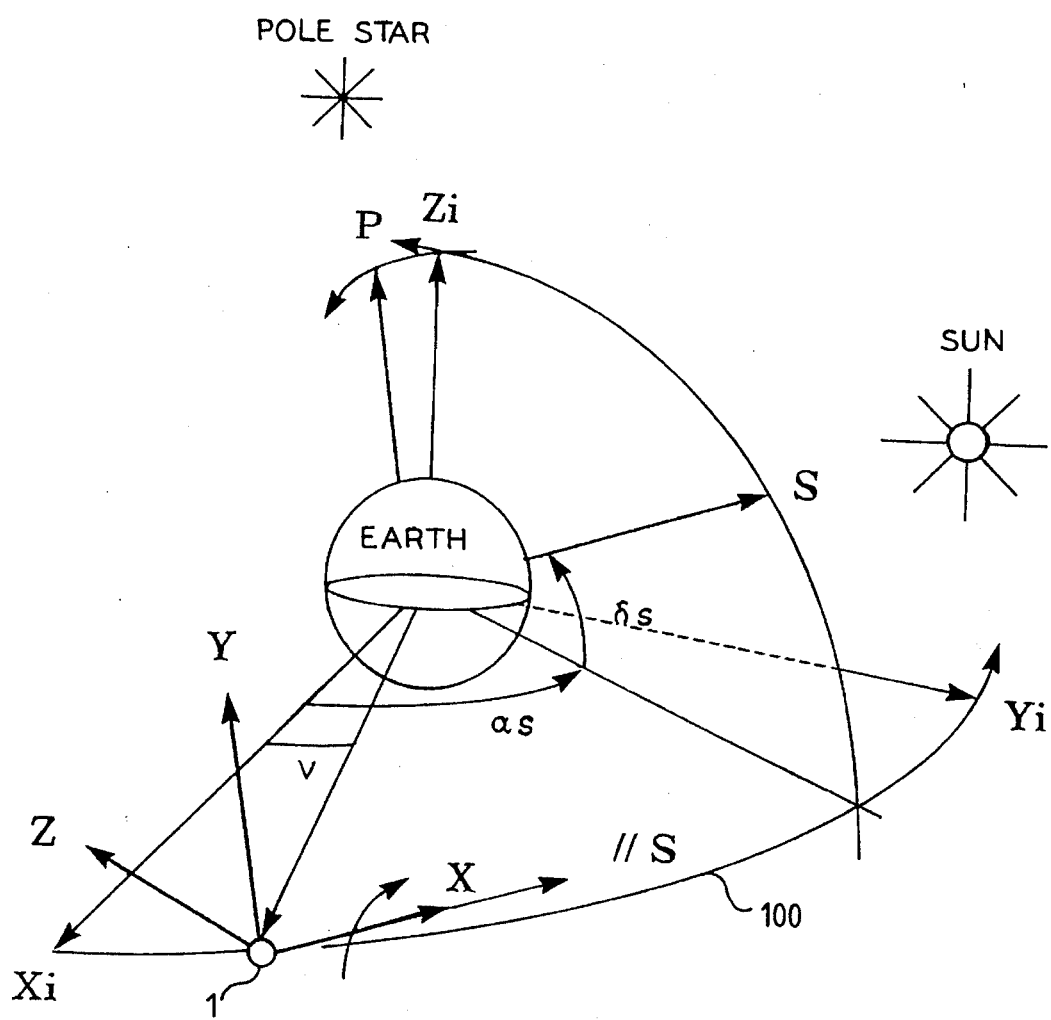
FIG. 6 is a diagram showing the attitude of the satellite in the Sun pointing configuration.

FIG. 5 is a block diagram showing how, in accordance with the invention, the various measurement signals supplied by the various sensing systems are used to move the satellite into a nominal attitude by means of appropriate command signals applied to the actuator system in an appropriate succession of sub-modes (i.e. attitudes).

This figure shows that the acquisition device for recovering this nominal attitude (acquisition mode) embodies:

measurement processing logic 21;

acquisition sub-mode chaining logic 22;

Pole Star identification logic 23; and attitude control logic 24 including a set of limiters and regulators 25, a set 27 of filters 26, a set 27 of modulators 27 and thruster selection logic 28.

The function of the measurement processing logic 21 has already been explained. The function of the others emerges from the analysis with respect to FIGS. 6 through 10 of the successive phases of the Earth acquisition method in accordance with the invention (even if there is not necessarily a single sub-mode for each phase).

The satellite is initially in a Sun pointing attitude (FIG. 6), i.e. its roll axis X is pointing towards the Sun (it must be borne in mind that it is only for the purposes of this disclosure that the Sun is represented in this figure and that in reality it would have to be represented a long distance outside the figure). The satellite rotates about its X axis which is temporarily parallel to the direction S between the Earth and the Sun characterized by its right ascension $\alpha$s and its declination $\delta$s. The orbit 100 is a geosynchronous orbit, for example. The angle $\upsilon$ defines the position of the satellite in its orbit in the inertial frame of reference.

Figure 7:
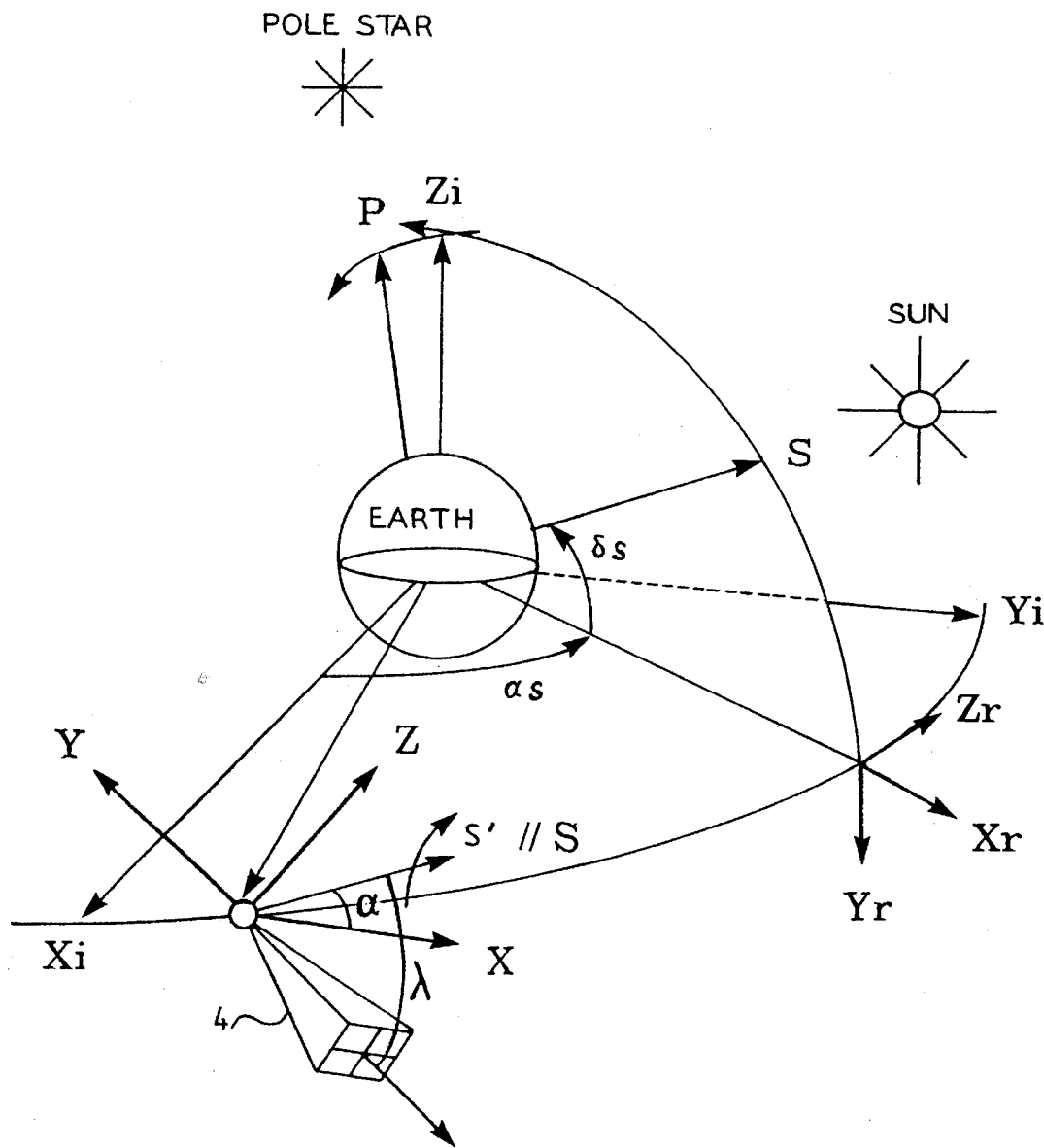
FIG. 7 is a diagram showing a first phase (Pole Star seek phase) of the Earth acquisition method in accordance with the invention, starting from the FIG. 6 configuration.

Earth acquisition (or reacquisition if the FIG. 6 attitude is the consequence of some incident), that is the change to a nominal attitude with the Z axis pointing towards the Earth, is the result of the following sequence of steps:

Step 1: Pole Star Seek (FIG. 7)

The actuator system is operated to move, preferably in the satellite (X, Y) plane, the vector S of the Sun direction through an angle α relative to its initial position substantially parallel to X. This (possibly negative) angle is chosen according to the date and is preferably at least approximately equal but opposite to the declination of the Sun to the Earth equatorial plane. This direction in the (X, Y, Z) frame of reference is denoted S'. The actuator system is also operated to maintain the satellite in an attitude relative to the Sun such that the satellite is caused to rotate about S' (and no longer about X), using for attitude control the signals from the Sun sensing subsystem and the angular speed sensing system.

More generally, the direction S' is chosen to be at an angle λ to the optical axis of the star sensor, and thus to the Y axis, which satisfies the condition:

$$90°-\delta s-Fspx<\lambda<90°-\delta s+Fspx$$

where δs is the declination of the Sun relative to the Equator and Fspx is the angular half-amplitude of the field of view of the star sensing system in a plane of the satellite containing the optical axis of the star sensing system and this orientation.

Because of this angular offset α between S' and X and because of the rotation about S' the satellite (X, Y, Z) frame of reference is superimposed at regular intervals on an (Xr, Yr, Zr) frame of reference such that the Xr axis is along the projection of the Sun vector onto the Earth equatorial plane, the Yr axis is directed towards the South and the Zr axis completes the orthogonal axis system. For this purpose the components Srx, Sry and Srz of the Sun vector in this (Xr, Yr, Zr) frame of reference are calculated and applied to the attitude control logic so that the latter may activate the thrusters to reduce the offsets between these components and the components Sbx, Sby and Sbz of the Sun vector in the satellite XYZ frame of reference. The Srx, Sry and Srz components are typically calculated on the basis of the right ascension angle as and declination angle δs of the direction of the Sun relative to the Xi Yi Zi geocentric inertial frame of reference.

The angular offset α is chosen so that on rotation about S' the field of view of the Pole Star sensor (directed along −Y) sweeps a cone of angle λ and thus an annulus of the celestial sphere which necessarily contains the Pole Star. This star is then sensed each time that the satellite frame of reference nears the target position (superimposition on the (Xr, Yr, Zr) frame of reference), given that the field of view of the sensor 4 is sufficiently wide in this recovery mode. It will be shown later that it is not necessary to sense the Pole Star to identify it.

In practice, because there are a large number of stars that can be sensed by the star sensor, several of them are seen by the sensor during this phase of rotation about the Sun. It is therefore essential to be able to identify the Pole Star in order to terminate the seek phase and switch to capture mode (step 2).

The algorithm for identifying the Pole Star (block 23 in the diagram) will be described in detail later, but for this Pole Star seek phase what is important is that this algorithm supplies to the block 22 in the diagram identification data preferably including at least the following parameters:

an indicator Idp initially set to 0 and then set to 1 as soon as the algorithm has identified the Pole Star; and an angle ΔΦp measuring the angular phase of the polar direction relative to the optical axis of the sensor 4 at all times starting from recognition of the Pole Star.

This first step represents a first sub-mode (Pole Star seek and identification).

Figure 8:
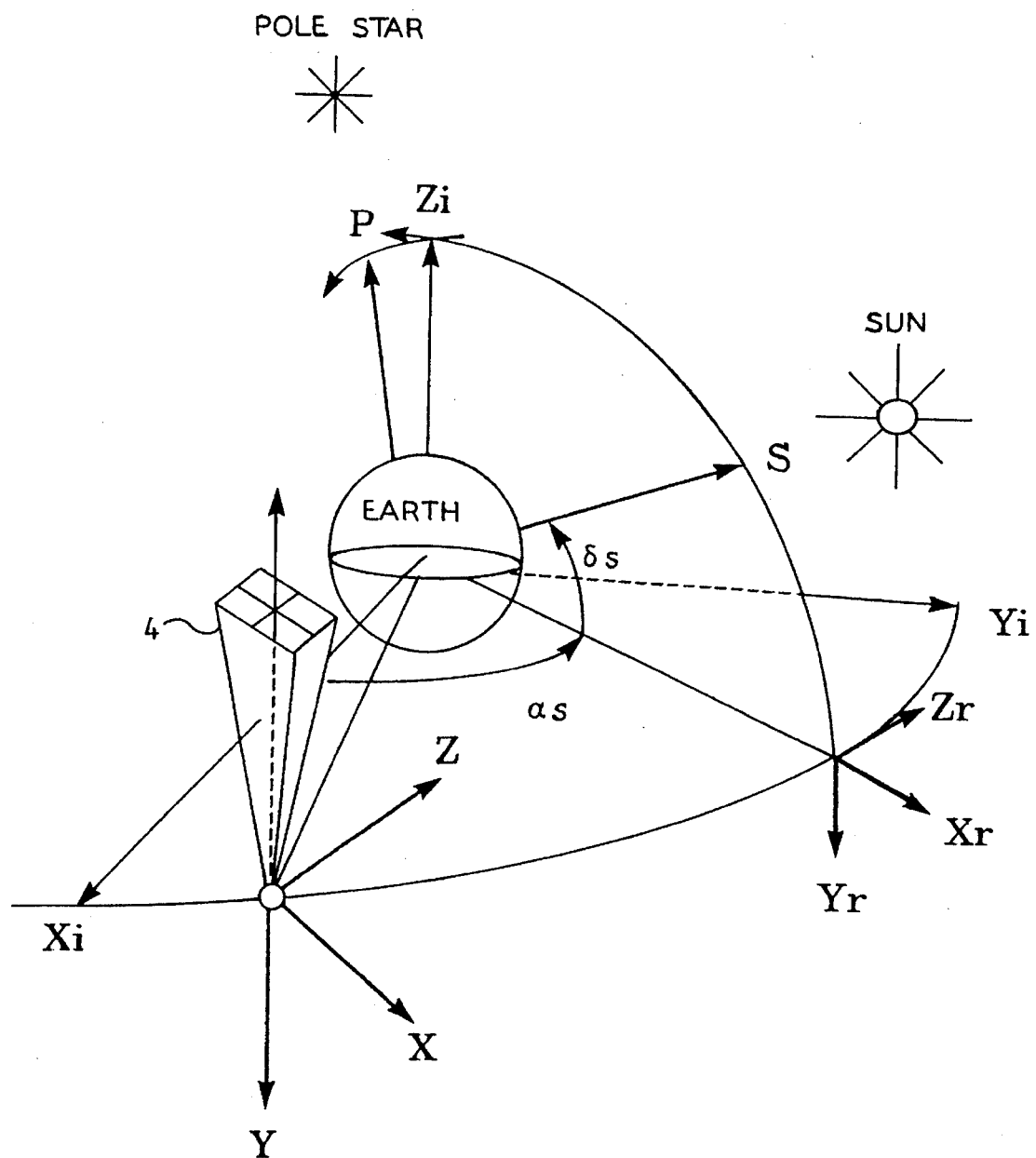
FIG. 8 is a diagram showing a second phase of this method (Pole Star capture)

Step 2: Braking of Rotation and Pole Star Capture (FIG. 8)

Once the Pole Star has been identified its angular offset relative to the optical axis of the sensor 4 is determined periodically and then rotation is braked using the thrusters so that the angular speeds are reduced, and in particular that about the X axis, so that the star slowly enters the field of view of the sensor.

This phase, which represents a second sub-mode, is preferably initiated as late as possible, as soon as the angle ΔΦp falls below a predetermined value ΔΦp1 (for example ΔΦp1=30°).

Then, as soon as the angular phase of the star—as calculated by the identification algorithm—drops below a predetermined angular threshold ΔΦp2—for example ΔΦp2= (half sensor field of view)—the capture phase starts automatically, representing a third sub-mode.

To this end the thrusters are commanded to maintain at zero the outputs of the Pole Star sensor 4 and the angular speeds of the satellite as measured by the rate gyros.

Figure 9:
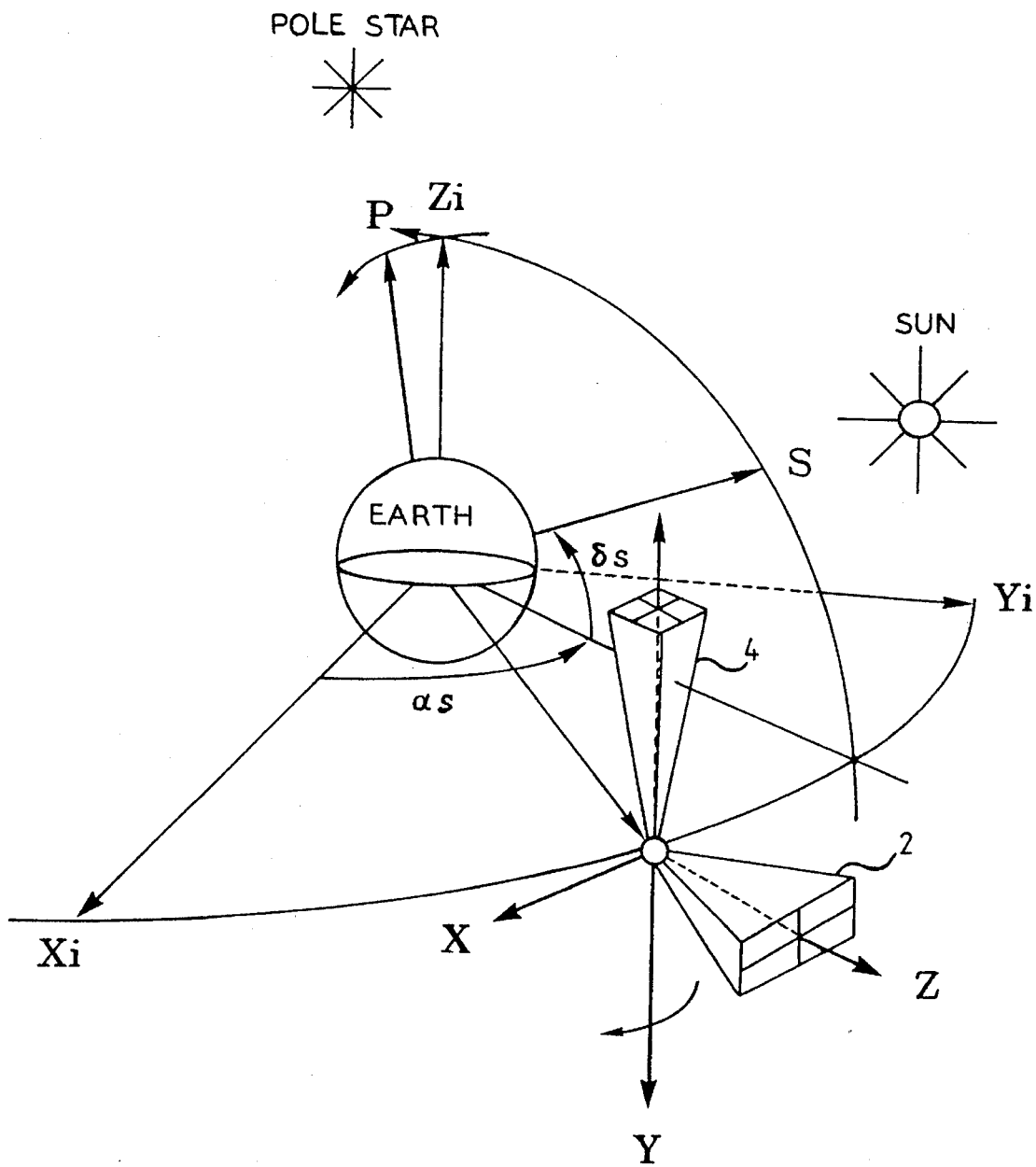
FIG. 9 is a diagram showing a third phase of this method (Earth seek)

Step 3: Earth Seek (FIG. 9)

Still using the rate gyros and the Pole Star sensor and either automatically after a time Δt34 starting from the beginning of the Pole Star capture phase or by remote control from the ground the satellite is rotated about the (−Y) axis, which is now close to the North-South direction, so that the Earth sensor can find the Earth.

In this fourth sub-mode (Earth seek) the Pole Star remains inside the field of view of the star sensor and attitude control is based on the roll and yaw angles measured by this sensor and on the angular speeds measured by the rate gyros, allowing for the set point speed about the Y axis, which is positive or negative depending on satellite solar time.

Figure 10:
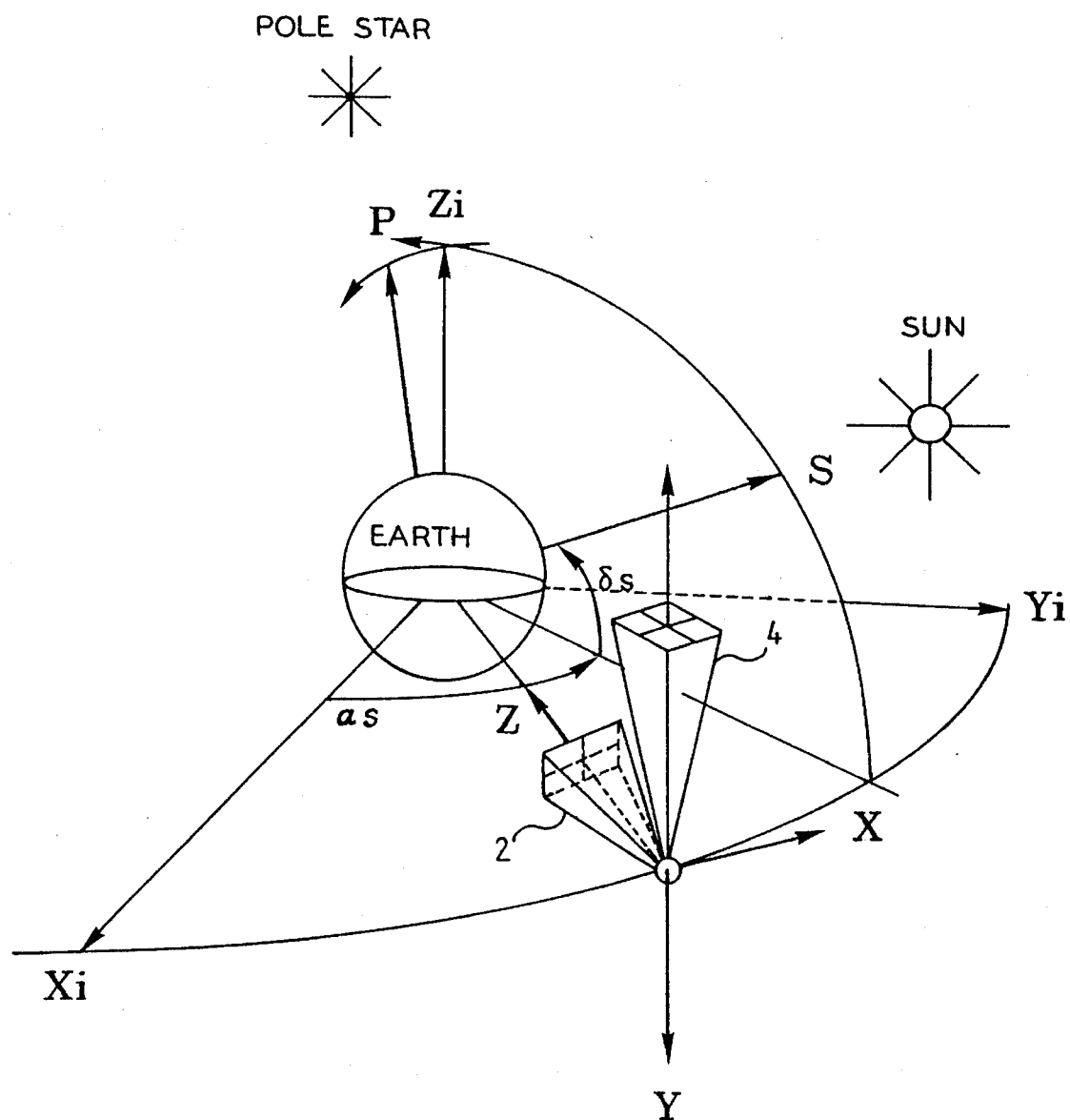
FIG. 10 is a diagram showing a fourth phase of this method (Earth capture)

Step 4: Earth Capture and Final Pointing (FIG. 10)

Immediately when the Earth enters the field of view of the Earth sensor the roll and pitch errors as measured by the sensor are used in conjunction with the yaw information from the Pole Star sensor and the angular speeds as measured by the rate gyros so that the Earth sensor can capture the Earth and the satellite frame of reference (X, Y, Z) is stabilized on the local orbital frame of reference (Xo, Yo, Zo). This fifth sub-mode (Earth capture) then terminates Earth acquisition with the Z axis pointing towards the center of the Earth and the Y axis pointing towards the South.

The principle of the Pole Star identification algorithm may be defined as follows: if a star of adequate magnitude (typically <3) crosses the field of view of the sensor 4 the latter supplies at a predetermined output frequency (typically 1 to 10 Hz) the coordinates Xsp and Zsp and the illumination of the image spot created by the star on the sensing member of the sensor (CCD strip, for example).

In particular, the time that the Pole Star will next enter the field of view of the sensor, which must be known to initiate the rotation braking and star capture sub-mode, is estimated by a dedicated algorithm which processes in real time the measurements carried out by the Sun and Pole Star sensors and by the rate gyros.

The basic principle of this algorithm is to correlate the star sequences as measured by the star sensor with a theoretical sequence calculated using a star catalog either on the ground or preferably in the satellite's onboard computer.

Identification of the Pole Star (block 23 in the diagram) can be subdivided into two key functions:

a data collection or preprocessing function (star measurement preprocessing and analysis block 23a) activated on each measurement cycle and enabling condensation of measurements carried out during transit of the stars across the field of view of the sensor and elimination of certain aberrant measurements (fixed spots, for example); and an identification function proper (star measurement correlation and Pole Star identification block 23b), based on the star catalog (block 23c) and activated by the preprocessor function when the number of measurements available becomes sufficient.

Figure 11:
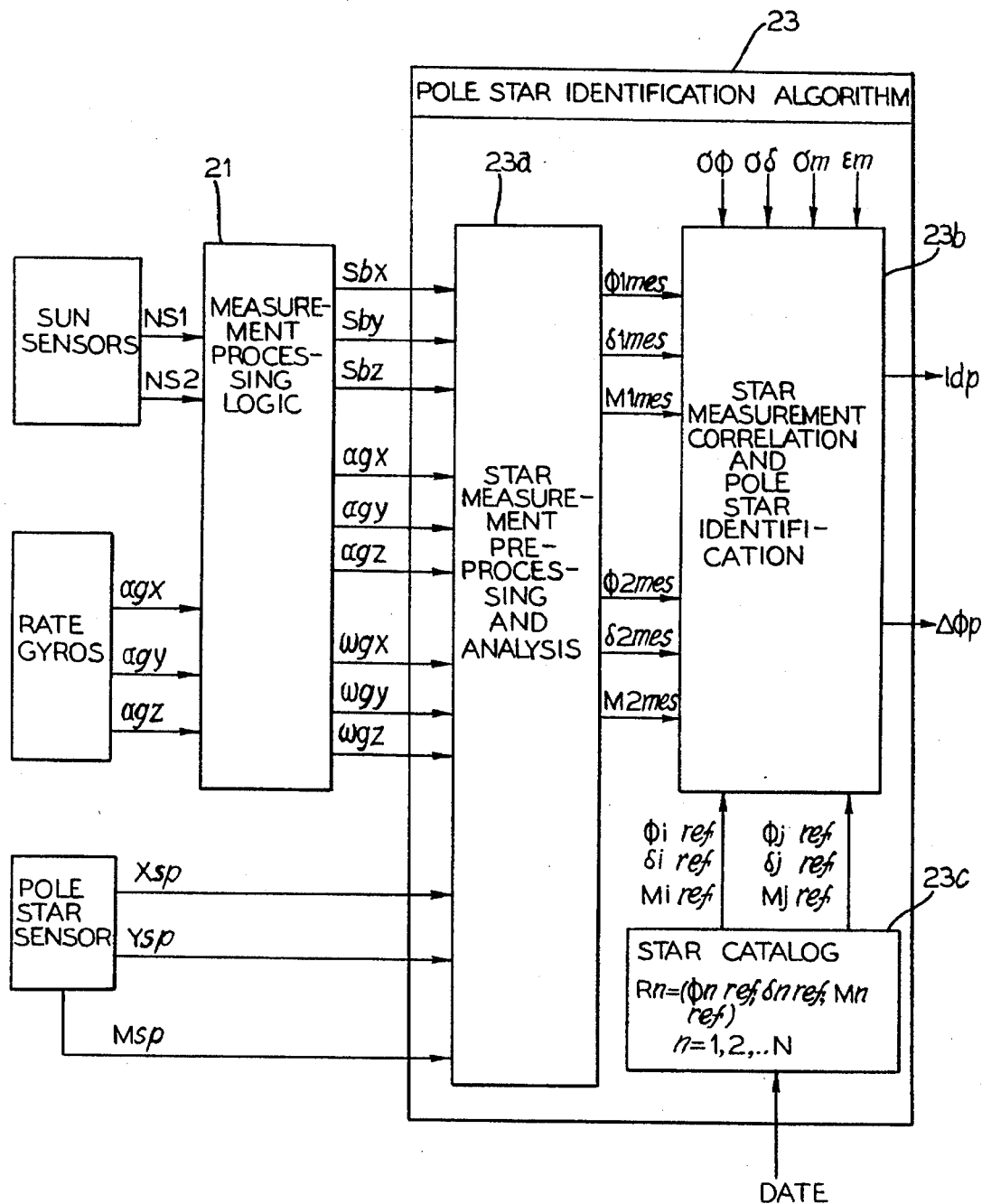
FIG. 11 is a block diagram of the Pole Star identification logic.

FIG. 11 is a block diagram of the Pole Star identification algorithm and the functions mentioned hereinabove are explained below.

Star Catalog

This catalog is based on a more general reference catalogs for example WERTZ, James, Editor, "Spacecraft Attitude Determination and Control", Reidel Publishing Company, Holland/U.S.A./England, 1986—and sets forth a list of N stars which must include the Pole Star and which may be "seen" by the sensor during scanning of the celestial sphere in rotation around the Sun (with the FIG. 7 offset λ).

Figure 12:
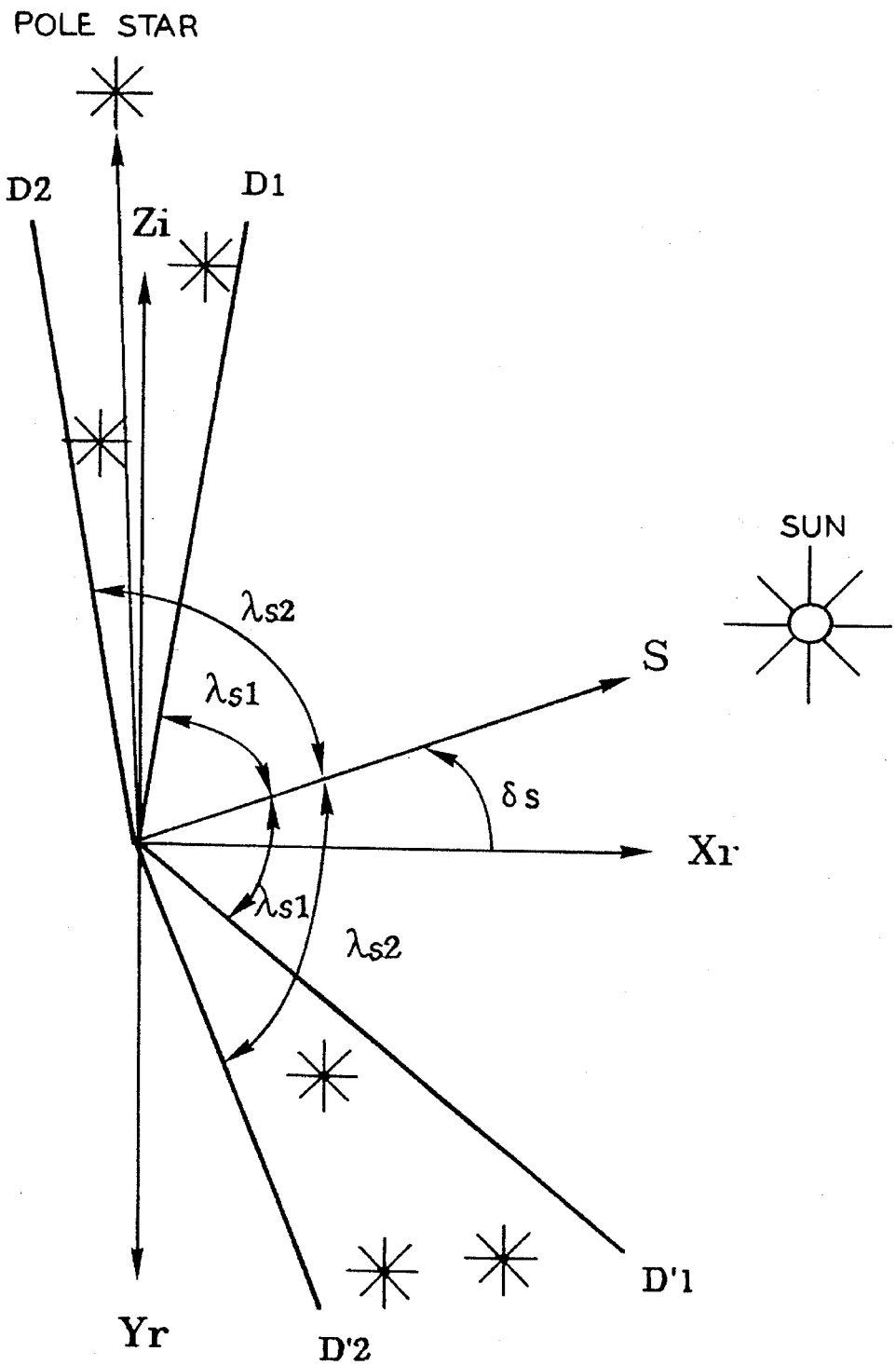
FIG. 12 is a diagram showing the hollow cone area swept by the star sensor and containing various stars including the Pole Star.

The stars included are typically those of the celestial sphere which are at least as bright as the Pole Star and whose direction E is at an angle to the Sun vector S equal to (90°—Sun declination±Fspx) where Fspx denotes the field of view of the Pole Star sensor about the Xsp axis parallel to the satellite X axis (see FIG. 12 where λ1 and λ2 represent the extreme acceptable values of λ). The number N of stars may be from 10 to 20 for an extremely compact on-board catalog to around 300 for a relatively detailed on-board catalog.

The catalog typically contains the following data for each star: magnitude (visual magnitude, for example), right ascension and declination relative to an inertial frame of reference such as the geocentric inertial frame of reference, for example.

Table 1 lists the hundred brightest stars in the sky classified in order of increasing visual magnitude, the magnitude being inversely proportional to the brightness of the star in the visible spectrum (the stars are actually characterized here by their brightness). This working catalog may equally well be based on star catalogs such as those of Yale University, the Smithsonian Institute or NASA).

Data Collection and Sensor and Rate Gyro Measurement Preprocessing

During each measurement cycle the preprocessor module 23a carries out at least the following operations:

1) Acquisition of data from the Pole Star sensor and the rate gyros.
2) Updating of the integrated rotation angle (already scanned angular amplitude) about the Sun vector, called the identification arc, and the angle of declination of the star detected relative to the plane perpendicular to the rotation axis. These angles are calculated according to the angular speeds sensed by the rate gyros and the measurements carried out by the Sun and Pole Star sensors.
3) Analysis and condensation of Pole Star sensor measurements to eliminate aberrant or unusable sensings such as those due to fixed spots or caused by two stars of similar magnitude entering the field of view of the star sensor at the same time.

Figure 13:
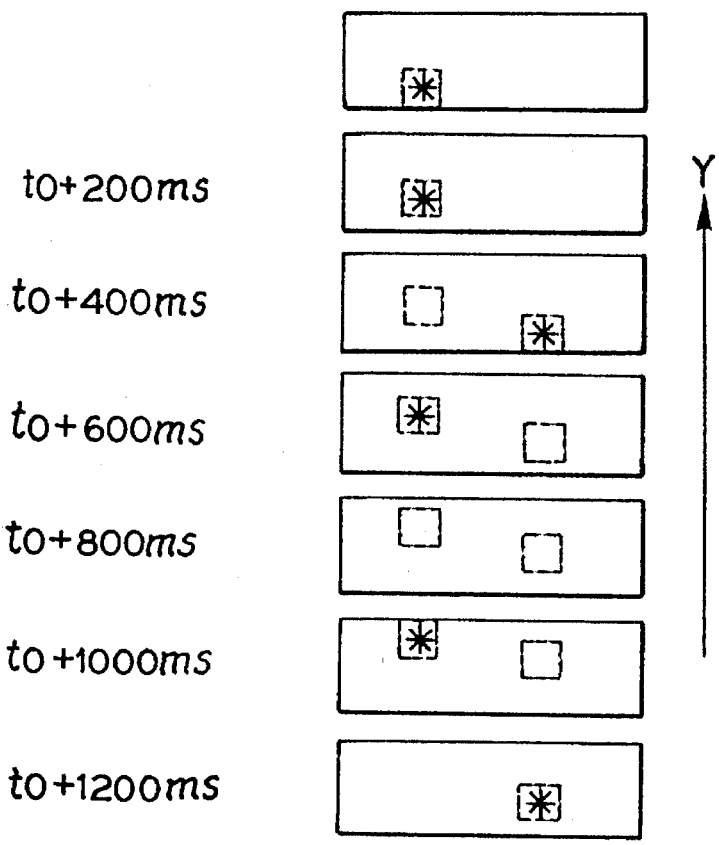
FIG. 13 is a set of seven successive views of the star sensor.

The principle of this elementary function is explained with reference to the following typical example, assuming a measurement period of 200 ms for the star sensor and a rotation speed of 0.5°/s around the Sun direction (see FIG. 13):

1. At t=t0 the sensor senses a bright spot and delivers its X and Y coordinates and its magnitude Mv. This data is stored by the preprocessor logic which creates a spot table containing the position of the star, the number of sensings (initialized to 1) and the mean of the measured magnitudes.
2. At t=t0+200 ms the logic predicts the position of the star 200 ms later, knowing the rotation speed of the satellite. Thus at 0.5°/s the star must have shifted 0.1° in the Y direction. As the spot detected at this time is near the predicted position, this spot will be attributed to the same star and the corresponding record will be updated: recentering on the measured position, incrementing of the number of sensings, updating of the magnitude mean.
3. At t=t0+400 ms the predicted position of the spot does not match the measured position and the logic therefore creates a new record representing a second star.
4. At t=t0+600 ms the spot sensed is again in corresponding relationship to the first record and the characteristics of the latter are updated as at t=t0+200 ms.
5. At t=t0+800 ms no star is sensed but the logic continues to predict the position of the spot.
6. At t=t0+1000 ms the spot sensed is again in corresponding relationship to the first record.
7. At t=t0+1200 ms the predicted position of spot 1 is outside the field of view, the star must have finished its transit and the logic establishes a balance in respect of this spot, producing a measurement M1 sent to the identification logic. This measurement M1 comprises the following data:

→ the current value of the integrated rate gyro signal: measured relative position or azimuth of the star (last value measured), → the abscissa of the spot, equivalent to the elevation above the plane perpendicular to the rotation axis, → the mean of the magnitudes over the N sensings.

8. The measurement M1 thus produced is then compared with those previously stored in order to retain only the brightest stars; spot 1 is deleted and the current measurement is henceforward attributed to spot 2.

To summarize, the measurement preprocessing function is used to carry out at least the following operations:

tracking several stars transiting simultaneously across the field of view of the star sensor;

eliminating fixed spots, erratic spots (as at t0+400 ms) or spots with a tracking speed that does not match the actual rotation speed of the satellite; and averaging the measured magnitudes and minimizing the effects of sensor noise.

Pole Star Identification

The identification function is activated as soon as at least two stars have been sensed and classified by the data collection function and the satellite has rotated through a minimum angle (or arc) Φmin (typically 90°).

The Pole Star is then identified by calculating the weighted distance $\Delta ij$ from the brightest pair of stars (M1, M2) as measured by the preprocessing logic to any pair of stars (Ri, Rj) from the reference catalog (with $1<i<N$ and $1<j<N$).

The weighted distance $\Delta ij$ is typically expressed as a simple function of the characteristics of the measured stars and the reference stars by means of the formula:

$$\Delta ij = [(\Phi 1mes - \Phi 2mes) - (\Phi iref - \Phi jref)]^2/(\sigma\Phi)^2 + [(\delta 1mes - \delta iref)^2/(\sigma\delta)^2 + [\delta 2mes - \delta jref)^2/(\sigma\delta)^2 + [M1mes - Miref)^2/(\sigma m)^2 +$$

$[(M2mes-Mjref)^2/(\sigma m)^2]$ where:

($\Phi$1mes–$\Phi$2mes) is the measured stars azimuth difference calculated from the rate gyro measurements, ($\Phi$iref–$\Phi$jref) is the azimuth difference for the catalog stars Ri, Rj, $\delta$1mes, $\delta$2mes are the elevations above the plane orthogonal to the Xsp axis, $\delta$iref, $\delta$jref are the elevations above the plane perpendicular to the rotation axis of the catalog stars Ri, Rj, M1mes, M2mes are the magnitudes of the measured stars, Miref, Mjref are the magnitudes of the reference stars Ri, Rj, $\sigma\Phi$ is the estimated standard deviation of the inaccuracy in the azimuth difference measurement, $\sigma\delta$ is the estimated standard deviation of the inaccuracy in the elevation measurement, $\sigma$m is the estimated standard deviation of the inaccuracy in the magnitude measurement.

If there are no measurement errors and no ambiguous star configurations the distance $\Delta$ij is null (or near zero) for the pair i0, j0 such that Ri0=M1 and Rj0=M2. If there are measuring errors the distance $\Delta$ij is not null and must be compared with a preselected tolerance threshold $\epsilon$m.

Figure 14:
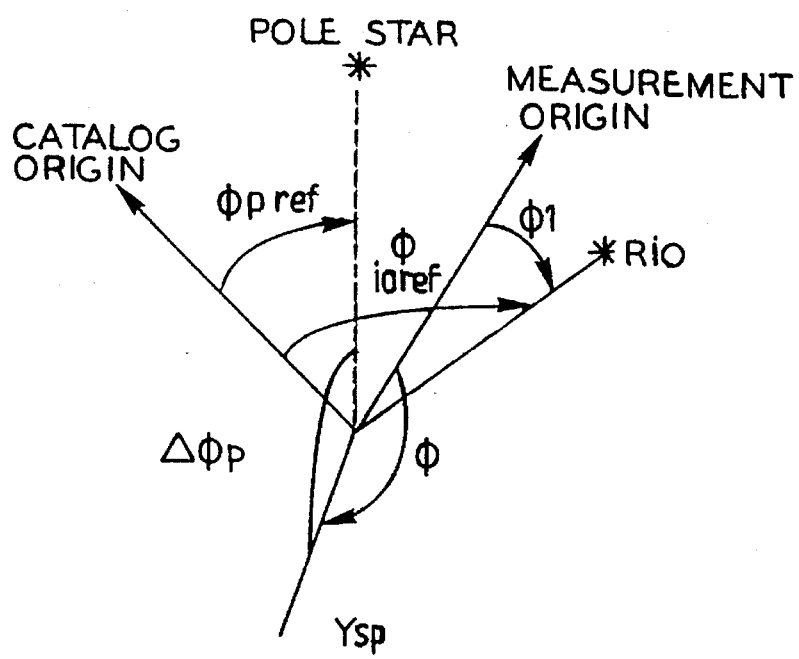
FIG. 14 is a diagram identifying the various magnitudes involved in identification of the Pole Star.

If the angular offset between the sequence of measured stars and the sequence of reference stars including the Pole Star is identified, the Pole Star identification flag Idp may be set to 1 and from this time on it is possible to calculate the angle (or the arc) $\Delta\Phi$p that remains before the next time the Pole Star enters the field of view of the sensor, this calculation using the equation (see FIG. 14):

$$\Delta\Phi p=360°-\Phi-(\Phi io\ ref-\Phi p\ ref)-\Phi 1$$

where:

$\Phi$ is the current identification arc;

$\Phi$i0 ref is the catalogued azimuth of the star Ri0;

$\Phi$p ref is the catalogued azimuth of the Pole Star; and $\Phi$1 is the measured azimuth of the star M1.

Note the very short time needed to identify the Pole Star, due in particular to the collection of data over a fraction of a rotation, given that a rotation typically takes 180 s to 720 s for rotation speeds from 2 degrees/s to 0.5 degree/s.

The attitude control logic 24 essentially embodies (see above) PD or PID type conventional linear regulators associated with a set of limiters 25, filters 26 and non-linear modulators 27 and thruster select logic 28 to generate torque about the three axes.

The regulators determine linear command torques based on sub-mode selection signals SM from the block 22 and on gains in position (Kpx, Kpy, Kpz) and in speed (Kdx, Kdy, Kdz) and on the following input parameters from block 21:

the Sun vector components Sbx, Sby, Sbz on the satellite axes (as measured by the Sun sensors) and the Sun vector components Srx, Sry, Srz in the reference frame of reference (as determined by the mode chaining logic 22), the roll and yaw attitude angles $\Phi$sp and $\phi$sp measured by the Pole Star sensor;

the pitch angle $\theta$st measured by the Earth sensor;

the angular speeds $\omega$gx, $\omega$gy and $\omega$gz measured by the rate gyros on the three axes; and the rotation speed set points for each sub-mode: Pole Star seek speed $\omega$rp, Pole Star capture speed $\omega$cp and Earth seek speed $\omega$rt.

Furthermore, and to prevent command saturation, these regulators are associated with a set of limiters or simple logic circuits linear around zero and having preselected position (Lpx, Lpy, Lpz) and speed (Ldx, Ldy, Ldz) saturation levels.

Figure 15:
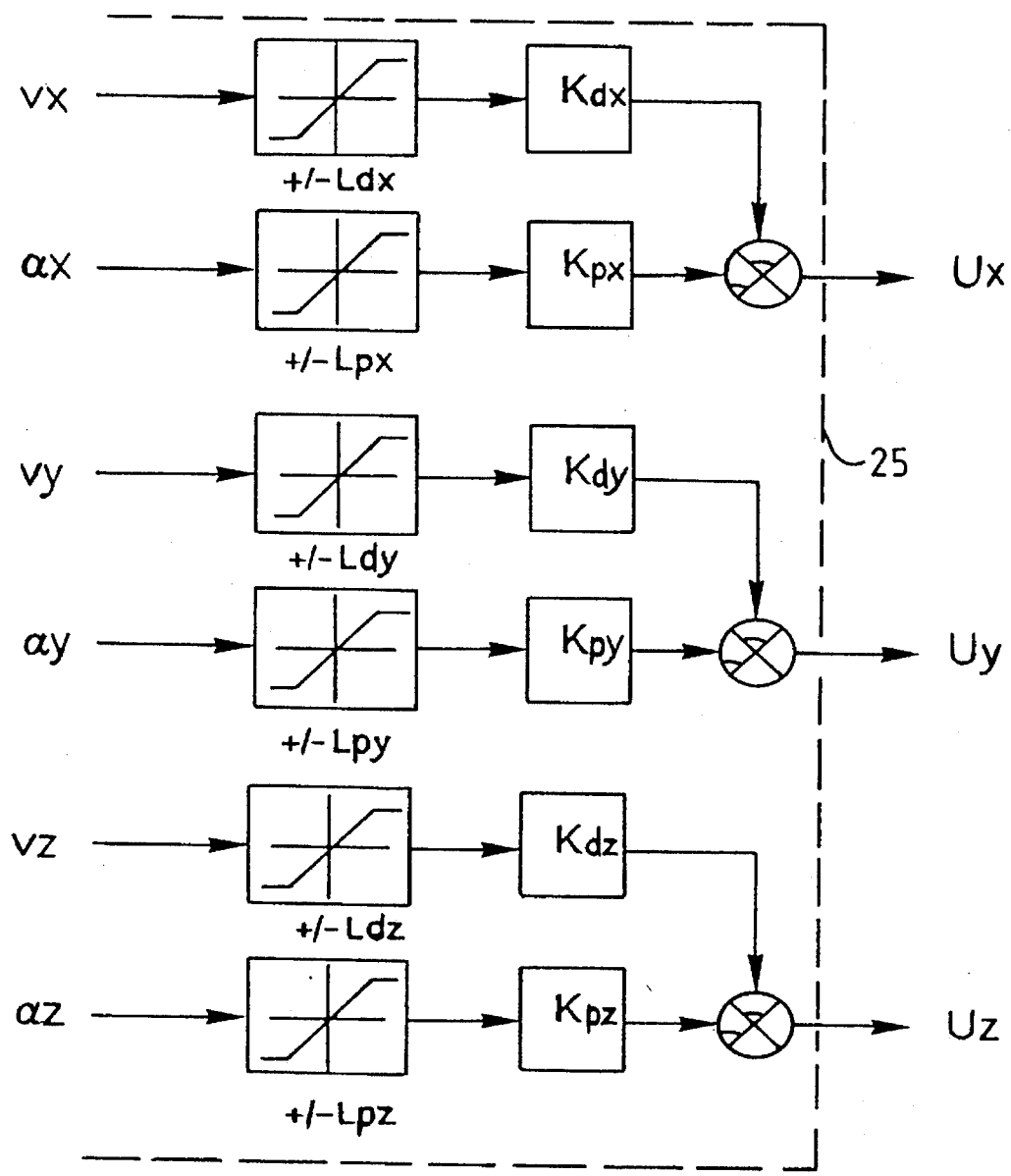
FIG. 15 is a block diagram of the regulator and limiter logic.

FIG. 15 shows the typical structure of the linear regulators and limiters and table 2 defines the digital preliminary processing carried out in the block 24 to produce the regulator input signals for the various Pole Star and Earth seek and capture steps.

The preferably digital and conventional type filters (second order filters, for example) reduce parasitic effects due to sensor noise, among other things, and filter the effects of flexible members (including solar generator panels and antennas).

Figure 16:
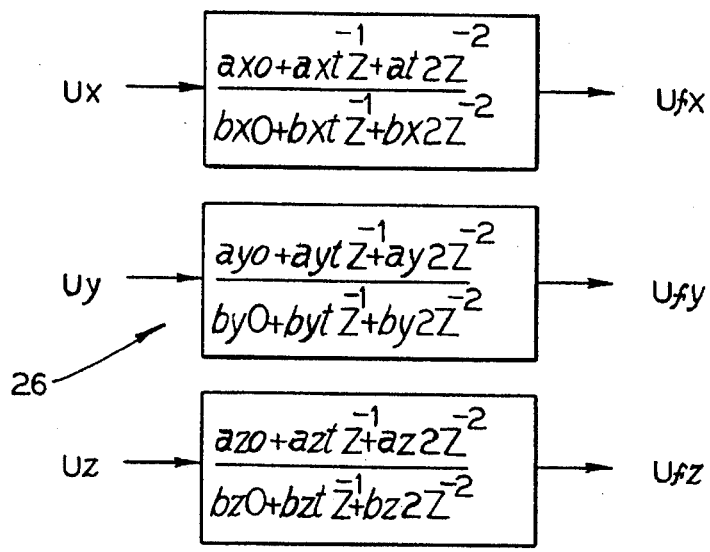
FIG. 16 is the block diagram of a second order filter.

FIG. 16 is a typical functional block diagram of a second order digital filter showing the equivalent discrete formula which may be written:

$$Ufi(n) = [-bi1*Ufi(n-1) - bi2*Ufi(n-2) + ai0*Ui(n) + ai1*Ui(n-1) + ai2*Ui(n-2)]/bio$$

where i=x, y or z.

The modulators are non-linear members generally defined by a control system structure typically embodying a saturable hysteresis non-linear logic (with parameters He and Ha) and a first order linear filter (with time constant Tm).

These modulators convert continuous input levels into equivalent series of pulses of level 0, +1 or –1, multiplied if necessary by a scale factor.

Figure 17:
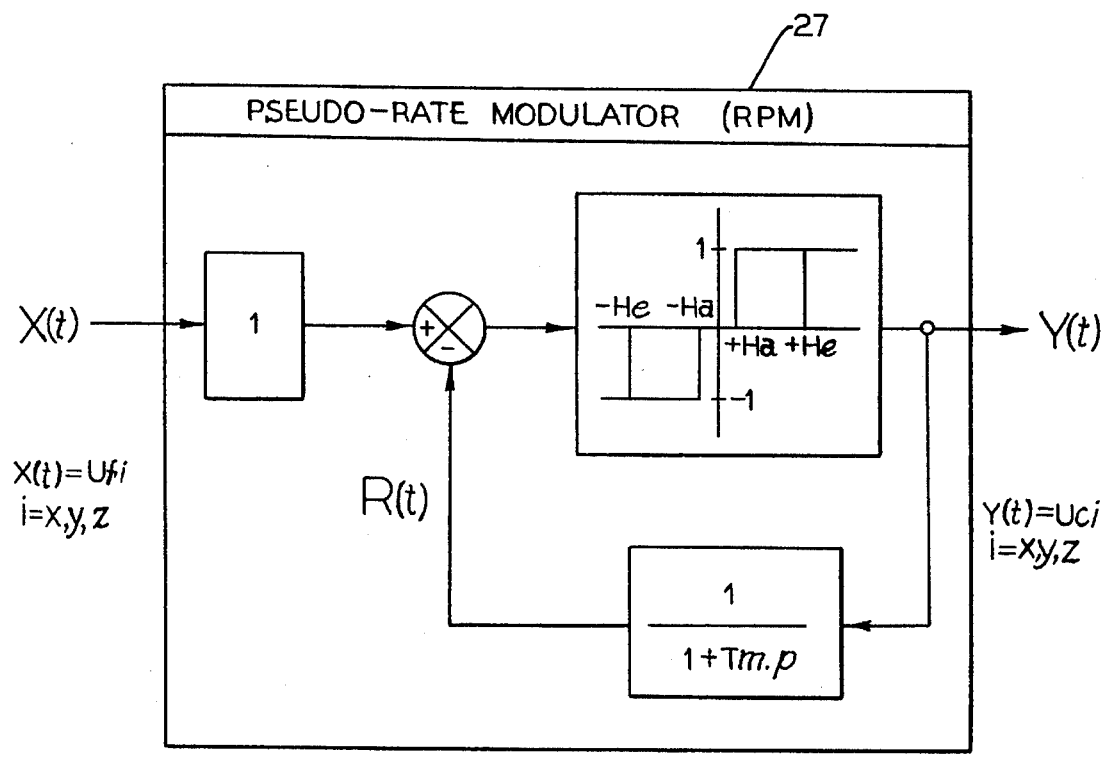
FIG. 17 is the block diagram of a 1-axis PRM modulator.

FIG. 17 shows the structure of a conventional Pseudo-Rate Modulator (PRM) with an output scale factor equal to 1.

Finally, the thruster selection logic is a hardwired or otherwise logical structure for activating the thrusters, denoted 2A, 3A, 4A, 5A, 6A, 7A, for example for branch A and 2B, 3B, 4B, 5B, 6B, 7B for a redundant branch B, so as to command attitude control torques about one or other of the three satellite axes.

The next two paragraphs set out typical thruster selection rules firstly in the ideal case where the thrusters generate pure torque about the three axes and secondly in the practical case where the pitch and yaw thrusters are coupled together, for example.

Thrusters with No Coupling (Pure Torque)

Ucx>0→activate thruster 6A or 6B

Ucx<0→activate thruster 7A or 7B

Ucy>0→activate thruster 2A or 2B

Ucy<0→activate thruster 3A or 3B

Ucz>0→activate thruster 4A or 4B

Ucz<0→activate thruster 5A or 5B

Thrusters with Pitch/Yaw Coupling

Ucx>0→activate thruster 6A or 6B

Ucx<0→activate thruster 7A or 7B

Ucy>0→activate thrusters 3A and 4A or activate thrusters 3B and 4B

Ucy<0→activate thrusters 2A and 5A or activate thrusters 2B and 5B

Ucz>0→activate thrusters 2A and 4A or activate thrusters 2B and 4B

Ucz<0→activate thrusters 3A and 5A or activate thrusters 3B and 5B

It goes without saying that the foregoing description has been given by way of non-limiting example only and that numerous variants may suggest themselves to one skilled in the art without departing from the scope of the invention.

TABLE 1

| STAR | BRIGHTNESS × 10⁻¹³ W/cm² | RIGHT ascension (degrees) | DECLINATION (degrees) |
|---|---|---|---|
| 1 SIRIUS | 49.00 | 100.93 | -16.67 |
| 2 CANOPUS | 20.00 | 95.81 | -52.68 |
| 3 VEGA | 10.50 | 278.96 | 38.75 |
| 4 RIGEL | 9.00 | 78.25 | -8.24 |
| 5 ACHERNAR | 8.00 | 24.13 | -57.40 |
| 6 HADAR | 6.80 | 210.39 | -60.22 |
| 7 RIGIL KENTAURUS | 6.60 | 219.35 | -60.70 |
| 8 ACRUX | 6.10 | 186.20 | -62.92 |
| 9 CAPELLA | 5.60 | 78.58 | 45.97 |
| 10 ARCTURUS | 5.30 | 213.55 | 19.35 |
| 11 PROCYON | 5.10 | 114.41 | 5.31 |
| 12 SPICA | 5.00 | 200.88 | -11.00 |
| 13 ALTAIR | 4.30 | 297.31 | 8.78 |
| 14 MIMOSA | 4.00 | 191.46 | -59.51 |
| 15 REGULUS | 3.80 | 151.67 | 12.12 |
| 16 ADHARA | 3.50 | 104.34 | -28.93 |
| 17 DENEB | 3.30 | 310.08 | 45.17 |
| 18 ALNILAM | 3.30 | 83.65 | -1.22 |
| 19 SHAULA | 3.30 | 262.86 | -37.08 |
| 20 BELLATRIX | 3.20 | 80.85 | 6.32 |
| 21 FORMALHAUT | 3.10 | 343.97 | -29.79 |
| 22 CASTOR | 2.60 | 113.14 | 31.96 |
| 23 ALKAID | 2.50 | 206.57 | 49.47 |
| 24 ALNITAK | 2.50 | 84.79 | -1.96 |
| 25 ELNATH | 2.40 | 81.07 | 28.58 |
| 26 ALIOTH | 2.40 | 193.16 | 56.13 |
| 27 MURZIM | 2.40 | 95.32 | -17.94 |
| 28 ALDEBARAN | 2.30 | 68.52 | 16.45 |
| 29 POLLUX | 2.30 | 115.84 | 28.11 |
| 30 MIAPLACIDUS | 2.20 | 138.21 | -69.59 |
| 31 GAMMA VELA | 2.20 | 122.14 | -47.24 |
| 32 CIH | 2.20 | 13.69 | 60.54 |
| 33 BETELGEUSE | 2.10 | 88.36 | 7.40 |
| 34 SAIPH | 2.10 | 86.56 | -9.68 |
| 35 NUNKI | 2.10 | 283.32 | -26.34 |
| 36 KAUS AUSTRALIS | 2.00 | 275.51 | -34.40 |
| 37 ALHENA | 2.00 | 98.97 | 16.43 |
| 38 PEACOCK | 2.00 | 305.78 | -56.84 |
| 39 NAOS | 1.90 | 120.61 | -39.91 |
| 40 AL NAIR | 1.80 | 331.56 | -47.12 |
| 41 DELTA VELA | 1.80 | 130.96 | -54.59 |
| 42 ANTARES | 1.70 | 246.86 | -26.36 |
| 43 ALPHERATZ | 1.70 | 1.68 | 28.91 |
| 44 MENKALIMAN | 1.60 | 89.30 | 44.95 |
| 45 MINTAKA | 1.60 | 82.59 | .32 |
| 46 DZUBA | 1.60 | 239.61 | -22.53 |
| 47 KAPPA SCORPIO | 1.50 | 265.07 | -39.02 |
| 48 ALUDRA | 1.50 | 110.71 | -29.24 |
| 49 MIRFAK | 1.40 | 50.51 | 49.75 |
| 50 THETA SCORPIO | 1.40 | 263.75 | -42.98 |
| 51 MIZAR | 1.40 | 200.66 | 55.09 |
| 52 E CENTAURUS | 1.40 | 204.46 | -53.30 |
| 53 H CENTAURUS | 1.40 | 218.37 | -42.02 |
| 54 KAPPA VELA | 1.40 | 140.28 | -54.87 |
| 55 AVIOR | 1.30 | 125.46 | -59.41 |
| 56 DENEBOLA | 1.30 | 176.86 | 14.75 |
| 57 MUHLIFAIN | 1.30 | 189.94 | -48.78 |
| 58 ALPHECCA | 1.30 | 233.33 | 26.82 |
| 59 Z OPHIUCHUS | 1.30 | 248.85 | -10.50 |
| 60 GACRUX | 1.20 | 187.34 | -56.93 |
| 61 WEZEN | 1.20 | 106.77 | -26.34 |
| 62 MERAK | 1.20 | 164.98 | 56.55 |
| 63 ACRAB | 1.20 | 240.89 | -19.72 |
| 64 DUBHE | 1.10 | 165.44 | 61.92 |
| 65 ATRIA | 1.10 | 251.32 | -68.97 |
| 66 POLARIS | 1.10 | 30.43 | 89.12 |
| 67 SCUTULUM | 1.10 | 137.64 | -62.19 |
| 68 ALPHA LUPUS | 1.10 | 219.95 | -47.25 |
| 69 PHECDA | 1.10 | 178.04 | 53.87 |
| 70 MARKAB | 1.10 | 345.79 | 15.03 |
| 71 BETA LUPUS | 1.10 | 224.11 | -43.01 |
| 72 U SCORPIO | 1.10 | 262.15 | -37.27 |
| 73 TAU SCORPIO | 1.10 | 248.47 | -28.15 |
| 74 RASALHAGUE | 1.00 | 263.36 | 12.58 |
| 75 DELTA CENTAURUS | 1.00 | 181.67 | -50.54 |
| 76 ZUBENESCH | 1.00 | 228.82 | -9.27 |
| 77 THETA AURIGA | 1.00 | 89.38 | 37.21 |
| 78 ZETA PERSEUS | 1.00 | 58.03 | 31.79 |
| 79 ALGENIB | 1.00 | 2.90 | 15.01 |
| 80 SABIK | .98 | 257.14 | -15.69 |
| 81 THETA CARINA | .97 | 160.45 | -64.23 |
| 82 EPSILON PERSEUS | .97 | 58.93 | 39.92 |
| 83 PHI SCORPIO | .97 | 239.23 | -26.02 |
| 84 ZETA TAURUS | .96 | 83.93 | 21.12 |
| 85 CAPH | .95 | 1.86 | 58.97 |
| 86 GEINAH | .95 | 183.54 | -17.36 |
| 87 GAMMA LUPUS | .95 | 233.25 | -41.06 |
| 88 Z SAGITTARIUS | .94 | 285.14 | -29.93 |
| 89 PHACT | .93 | 84.62 | -34.09 |
| 90 ZOSCA | .92 | 168.10 | 20.70 |
| 91 ALPHA ARA | .92 | 262.34 | -49.85 |
| 92 SIGMA SCORPIO | .90 | 244.81 | -25.52 |
| 93 ZETA CENTAURUS | .89 | 208.38 | -47.13 |
| 94 SADIR | .88 | 305.27 | 40.15 |
| 95 ALDERAMIN | .88 | 319.45 | 62.45 |
| 96 MU SCORPIO | .88 | 252.42 | -37.99 |
| 97 DELTA CRUX | .85 | 183.36 | -58.57 |
| 98 Z CANIS MAJOR | .85 | 94.77 | -30.05 |
| 99 DIPHDA | .83 | 10.50 | -18.16 |
| 100 A CN VN CAROLI | .82 | 193.63 | 38.49 |

TABLE 2

| STEP | POSITION ERRORS | SPEED ERRORS |
|---|---|---|
| POLE STAR SEEK AND BRAKING ($\Omega = \omega rp; \omega cp$) | $\alpha x = SRz*SBy - SRy*SBz$<br>$\alpha y = SRx*SBz - SRz*SBx$<br>$\alpha z = SRy*SBx - SRx*SBy$ | $vx = \omega gx - \Omega*SBx$<br>$vy = \omega gy - \Omega*SBy$<br>$vz = \omega gz - \Omega*SBz$ |
| POLE STAR CAPTURE | $\alpha x = \phi sp$<br>$\alpha y = 0$<br>$\alpha z = \phi sp$ | $vx = \omega gx$<br>$vy = \omega gy$<br>$vz = \omega gz$ |
| EARTH SEEK | $\alpha x = \phi sp$<br>$\alpha y = 0$<br>$\alpha z = \phi sp$ | $vx = \omega gx$<br>$vy = \omega gy - \omega rt$<br>$vz = \omega gz$ |
| EARTH CAPTURE | $\alpha x = \phi st$<br>$\alpha y = \theta st$<br>$\alpha z = \phi sp$ | $vx = \omega gx$<br>$vy = \omega gy$<br>$vz = \omega gz$ |

There is claimed:

1. A method for earth acquisition by a satellite in Earth orbit at an inclination of less than about 10 degrees to the Earth's equator, said satellite being normally stabilized in a nominal attitude about roll (X), pitch (Y) and yaw (Z) axes and comprising:

a two-axis Earth sensing system (2) having an optical axis (Zst) normally pointed toward the Earth such that said optical axis (Zst) of said Earth sensing system (2) is substantially parallel to said yaw axis (Z), a two-axis star sensing system (4) having an optical axis (Ysp) normally pointed towards the Pole Star such that said optical axis (Ysp) of said star sensing system (4) is substantially parallel to said pitch axis (Y), and a Sun sensing system comprising a two-axis Sun sensing sub-system (3) having an optical axis (Xss) substantially orthogonal to said optical axis (Ysp) of said star sensing system (4) and transverse to said optical axis (Zst) of said Earth sensing system (2), said method initiated when said satellite is in a non-nominal attitude and comprising the steps of:

orienting said satellite such that said optical axis (Xss) of said Sun sensing sub-system (3) is pointed approximately towards the Sun and establishing a Sun pointing attitude in which a Sun direction (S') is defined by a line between the Sun and said satellite;

commanding an angular displacement of said satellite such that said Sun direction (S') is oriented to be approximately at an angle λ relative to said optical axis (Ysp) of said star sensing system (4) while remaining within a field of view of said Sun sensing sub-system (3), said angle λ being other than 90 degrees and satisfying the condition:

90°−δs−Fspx<λ<90°−δs+Fspx where δs is the declination of the Sun relative to the Earth's equator and Fspx is an angular half-amplitude of a field of view of said star sensing system (4) in a plane of said satellite containing said optical axis (Ysp) of said star sensing system (4) and said Sun direction (S');

rotating said satellite about said Sun direction (S') such that said optical axis (Ysp) of said star sensing system (4) defines at least a portion of a cone whose axis is directed approximately towards the Sun and having a half-angle approximately equal to λ;

sensing at least two stars with said star sensing system (4);

comparing said at least two stars with star data stored in a catalog which is determined as a function of λ, said star data identifying a plurality of stars including the Pole Star;

identifying said at least two stars;

estimating a time at which said optical axis (Ysp) of said star sensing system (4) will point substantially towards the Pole Star;

ceasing rotation of said satellite about said Sun direction (S') so as to substantially align the Pole Star with said optical axis (Ysp) of said star sensing system (4);

rotating said satellite about said optical axis (Ysp) of said star sensing system (4) until the Earth is sensed by said Earth sensing system (3); and substantially aligning said optical axis (Zst) of said Earth sensing system (3) with the Earth.

2. A method according to claim 1 further comprising the step of establishing said optical axis of said Sun sensing sub-system to be substantially parallel to said roll axis.

3. A method according to claim 1 further comprising the step of establishing said Sun direction within said field of view of said Sun sensing sub-system to be substantially coplanar with said optical axes of said Sun sensing sub-system and said star sensing system.

4. A method according to claim 1 wherein said step of rotating said satellite about said Sun direction and said sensing step include measuring coordinates of said at least two stars, and comparing a measured distance between two of said at least two stars with distances predicted between pairs of said stars whose star data are stored in said catalog, and identifying said two of said at least two stars with a corresponding pair of stars from said catalog which are spaced approximately the same distance apart as said two of said at least two stars.

5. A method according to claim 4 wherein said sensing step further includes measuring a magnitude of brightness of each star of said at least two stars, and wherein said two of said at least two stars are the brightest two stars of all the stars.

6. A method according to claim 1 further comprising the step of establishing said catalog such that said star data includes the magnitude, right ascension and declination relative to an inertial frame of reference for between 10 and 300 stars.

7. A method according to claim 1 wherein said sensing step includes sensing said at least two stars while said satellite rotates about said Sun direction through an angle of at most about 180°.

8. A device for establishing earth acquisition by a satellite in Earth orbit at an inclination of less than about 10 degrees to the Earth's equator, said satellite being normally stabilized in nominal attitude about roll (X), pitch (Y) and yaw (Z) axes thereof and comprising:

a two-axis Earth sensing system (2) having an optical axis (Zst) normally pointed towards the Earth such that said optical axis (Zst) of said Earth sensing system (2) is substantially parallel to said yaw axis (Z), said Earth sensing system (2) generating measurement signal coordinates in a frame of reference defined by said yaw axis (Z), a two-axis star sensing system (4) having an optical axis (Ysp) normally pointed towards the Pole Star such that said optical axis (Ysp) of said star sensing system (4) is substantially parallel to said pitch axis (Y), said star sensing system (4) generating measurement signal coordinates in a frame of reference defined by said pitch axis (Y), a Sun sensing system comprising a two-axis Sun sensing sub-system (3) having an optical axis (Xss) which is substantially orthogonal to said optical axis (Ysp) of said star sensing system (4) and transverse to said optical axis (Zst) of said Earth sensing system (2), said Sun sensing sub-system (3) generating measurement signal coordinates in a frame of reference defined by said roll axis (X), an angular speed sensing system (5) mounted to said satellite for measuring speeds about three axes, an actuator system (6) mounted to said satellite for generating command torque on said satellite, and a processing system (7) in communication with said Earth sensing system (2), said star sensing system (4), said Sun sensing sub-system (3), said angular speed sensing system (5) and said actuator system (6), said processing system (7) generating command instructions for said actuator system (6) on the basis of said measurement signal coordinates generated by said Earth sensing system (2), said star sensing system (4) and said Sun sensing sub-system (3), and from signals generated by said angular speed sensing system (5), wherein said processing system comprises:

measurement processing logic (21) in communication with said Earth sensing system (2), said star sensing system (4), said Sun sensing sub-system (3) and said angular speed sensing system (5), said measurement processing logic (21) determining a direction of the Sun relative to said satellite, an instantaneous speed of said satellite and an orientation of said satellite relative to said roll (X), pitch (Y) and yaw (Z) axes from said measurement signal coordinates in said frames of reference defined by said roll (X), pitch (Y) and yaw (Z) axes;

Pole Star identification logic (23) in communication with said measurement processing logic (21) and said star sensing system (4), said Pole Star identification logic (23) including a catalog (23c) which stores data pertaining to the identification of a plurality of stars, said Pole Star identification logic (23) identifying stars sensed by said star sensing system (4) and stored by said catalog (23c) on the basis of signals generated by said star sensing system (4) and said direction of the Sun, said instantaneous speed of said satellite, and said orientation of said satellite relative to said roll (X), pitch (Y) and yaw (Z) axes, said Pole Star identification logic (23) further estimating when the Pole Star will be detected by said star sensing system (4), said Pole Star identification logic (23) generating identification data pertaining to the Pole Star;

acquisition sub-mode chaining logic (22) in communication with said measurement processing logic (21) and said Pole Star identification logic (23) for generating acquisition sub-mode selection signals on the basis of said direction of the Sun, said instantaneous speed of said satellite, said orientation of said satellite relative to said roll (X), pitch (Y) and yaw (Z) axes, and said identification data from said Pole Star identification logic (23); and attitude control logic (24) in communication with said acquisition sub-mode chaining logic (22) and generating command signals to said actuator system (6) on the basis of said selection signals of said acquisition sub-mode chaining logic (22) and said direction of the Sun, said instantaneous speed of said satellite, and said orientation of said satellite relative to said roll (X), pitch (Y) and yaw (Z) axes;

whereby, during a first sub-mode, said optical axis (Ysp) of said star sensing system (4) is scanned in a manner which defines at least a portion of a cone whose axis is directed approximately towards the Sun and having a half-angle at least approximately equal to an angular offset between said direction of the Sun and a Pole Star direction defined by a line between said satellite and the Pole Star, rotation of said satellite is arrested during a second sub-mode, the Pole Star is detected by said star sensing system (4) during a third sub-mode such that said optical axis (Ysp) of said star sensing system (4) points substantially towards the Pole Star, said satellite is rotated about said pitch axis (Y) during a fourth sub-mode while the Pole Star remains substantially aligned with said optical axis (Ysp) of said star sensing system (4), and the Earth is detected with said Earth sensing system (2) during a fifth sub-mode.

9. A device according to claim 8 wherein said identification data generated by said Pole Star identification logic includes a binary signal which changes level when the Pole Star is identified and an angular signal representing an angular offset between said Pole Star direction and said optical axis of said star sensing system.

10. A device according to claim 8 wherein said attitude control logic comprises a set of regulators and limiters specific to each of said first, second, third, fourth and fifth sub-modes.

11. A device according to claim 10 wherein each one of said regulators and limiters is linear.

12. A device according to claim 10 wherein said attitude control logic comprises filters at outputs of said set of regulators and limiters.

13. A device according to claim 12 wherein said filters are second order digital filters.

14. A device according to claim 12 wherein said attitude control logic further comprises modulators at outputs of said filters.

15. A device according to claim 14 wherein said modulators are Pseudo-Rate Modulators.

16. A device according to claim 8 wherein said actuator system comprises thrusters and said attitude control logic comprises thruster selection logic.

* * * * *

UNITED STATES PATENT AND TRADEMARK OFFICE
CERTIFICATE OF CORRECTION

PATENT NO. : 5,508,932
DATED : April 16, 1996
INVENTOR(S) : Achkar et al

It is certified that error appears in the above-indentified patent and that said Letters Patent is hereby corrected as shown below:

Column 2, line 18, delete "contr⊕ le" and insert ---- contrôle ----.

Column 4, line 52, delete "sped" insert ---- speed ----.

Column 5, line 31, delete "fillers" insert ---- filters ----.

Column 7, line 35, delete "X," and insert ---- (X, ----.

Column 7, line 67, delete "asp" and insert ---- $\alpha$sp ----.

Column 8, line 49, delete "27", second occurrence.

Column 9, line 42, delete "as" and insert ---- $\alpha$s ----.

Column 11, line 16, delete "catalogs" insert ---- catalog ----.

Column 16, in Table 2, in lines under "CAPTURE" first and second occurrences, and "SEEK", delete "$\alpha z = \phi sp$" and insert ---- $\alpha z = \varphi sp$ ----.

Column 17, lines 40 and 42, delete "(3)" and insert ---- (2) ----.

Signed and Sealed this

Eighteenth Day of February, 1997

Attest:

BRUCE LEHMAN

*Attesting Officer*         *Commissioner of Patents and Trademarks*